219-121.
4-23-74      XR      3,806,829

United States Patent [19]
Duston et al.

[11] 3,806,829
[45] Apr. 23, 1974

[54] PULSED LASER SYSTEM HAVING IMPROVED ENERGY CONTROL WITH IMPROVED POWER SUPPLY LASER EMISSION ENERGY SENSOR AND ADJUSTABLE REPETITION RATE CONTROL FEATURES

[75] Inventors: David K. Duston, Schenectady; Jeffrey B. Duncan, Cropseyville, both of N.Y.

[73] Assignee: Systomation, Incorporated, Schenectady, N.Y.

[22] Filed: Apr. 13, 1971

[21] Appl. No.: 133,536

[52] U.S. Cl......... 331/94.5, 219/121 LM, 315/242, 250/204, 323/9, 90/58 R
[51] Int. Cl. ...... H01s 3/09, H01s 3/10, B23k 27/00
[58] Field of Search. 331/94.5; 219/121 L, 121 LM, 219/121 EB; 315/242; 90/58 R

[56] References Cited
UNITED STATES PATENTS

| | | | |
|---|---|---|---|
| 3,369,101 | 2/1968 | DiCurcio | 331/95.4 X |
| 3,475,651 | 10/1969 | Harding et al. | 315/242 |
| 3,420,719 | 1/1969 | Potts | 148/188 |
| 3,515,938 | 6/1970 | Morse | 331/94.5 X |

OTHER PUBLICATIONS
Gresser, Microwaves, July, 1966, pp. 50–53.

Pogoda et al., "Mmhelts" TRG Corp. Report, 086-1, AD 658175, Aug. 1967, pp. 1–23, 27–35, 48, 49.
Dean, IBM Tech. Discl. Bull. Vol. 12, No. 12, May 1970, p. 2131.

*Primary Examiner*—Ronald L. Wibert
*Assistant Examiner*—R. J. Webster
*Attorney, Agent, or Firm*—Charles W. Helzer

[57] ABSTRACT

A pulsed, optically pumped laser, employing flashlamps excited via a pulse forming network from an array of storage capacitors and arranged so that the stored charge in these capacitors determines the laser beam emission intensity, is disclosed. The laser output beam intensity is sampled during each laser pulse by a photodiode for deriving a sensed actual laser beam energy signal. This signal is compared with a desired output energy intensity signal, the latter being pre-programmable into the system, or capable of being set manually.

The flashlamp input is adjusted accordingly as a result of the comparison, to obtain laser output beam intensity uniformity on a pulse-to-pulse basis. The flashlamp trigger rate is variable.

Also disclosed are an automatic workpiece positioning support, a heat sink and laser output beam diverter, and a protective tape for a laser beam focussing lens.

28 Claims, 15 Drawing Figures

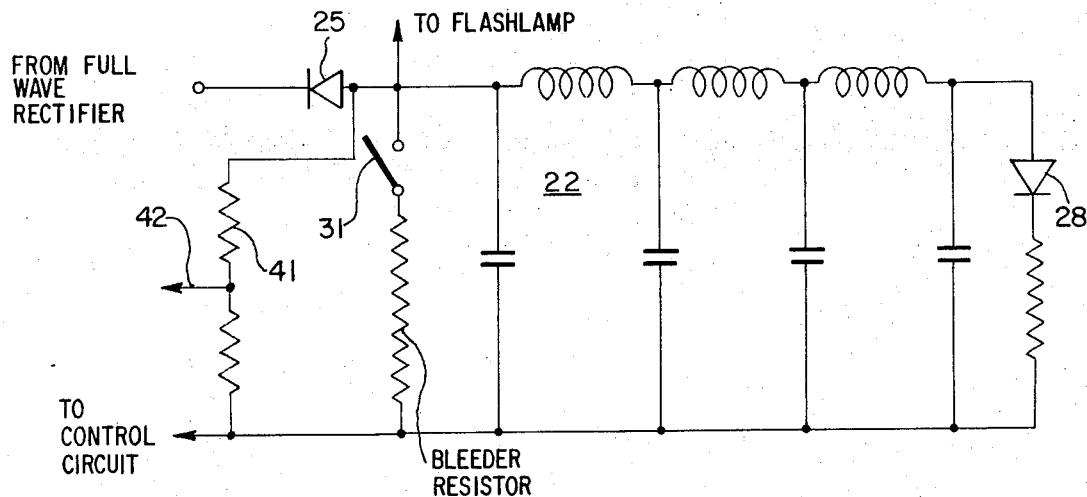
FIG. 4
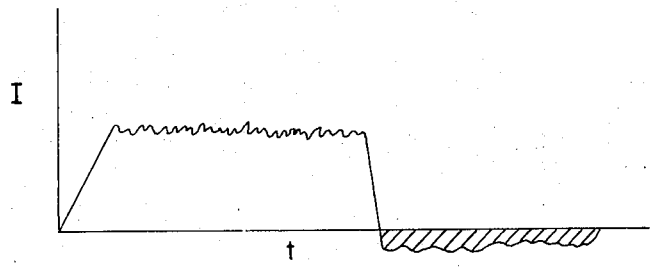
FIG. 4A
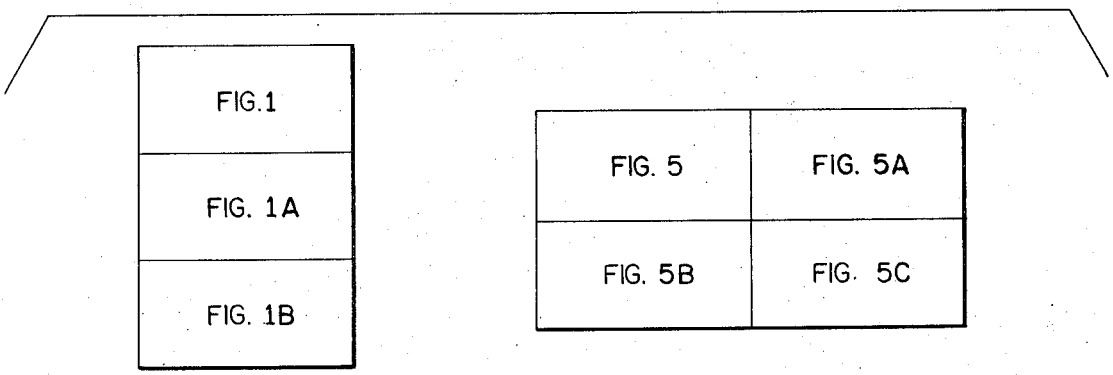
FIG. 2
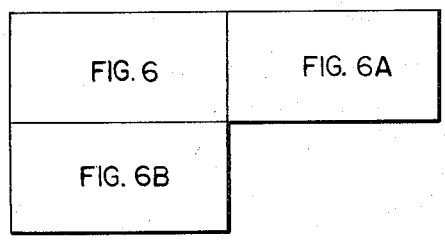

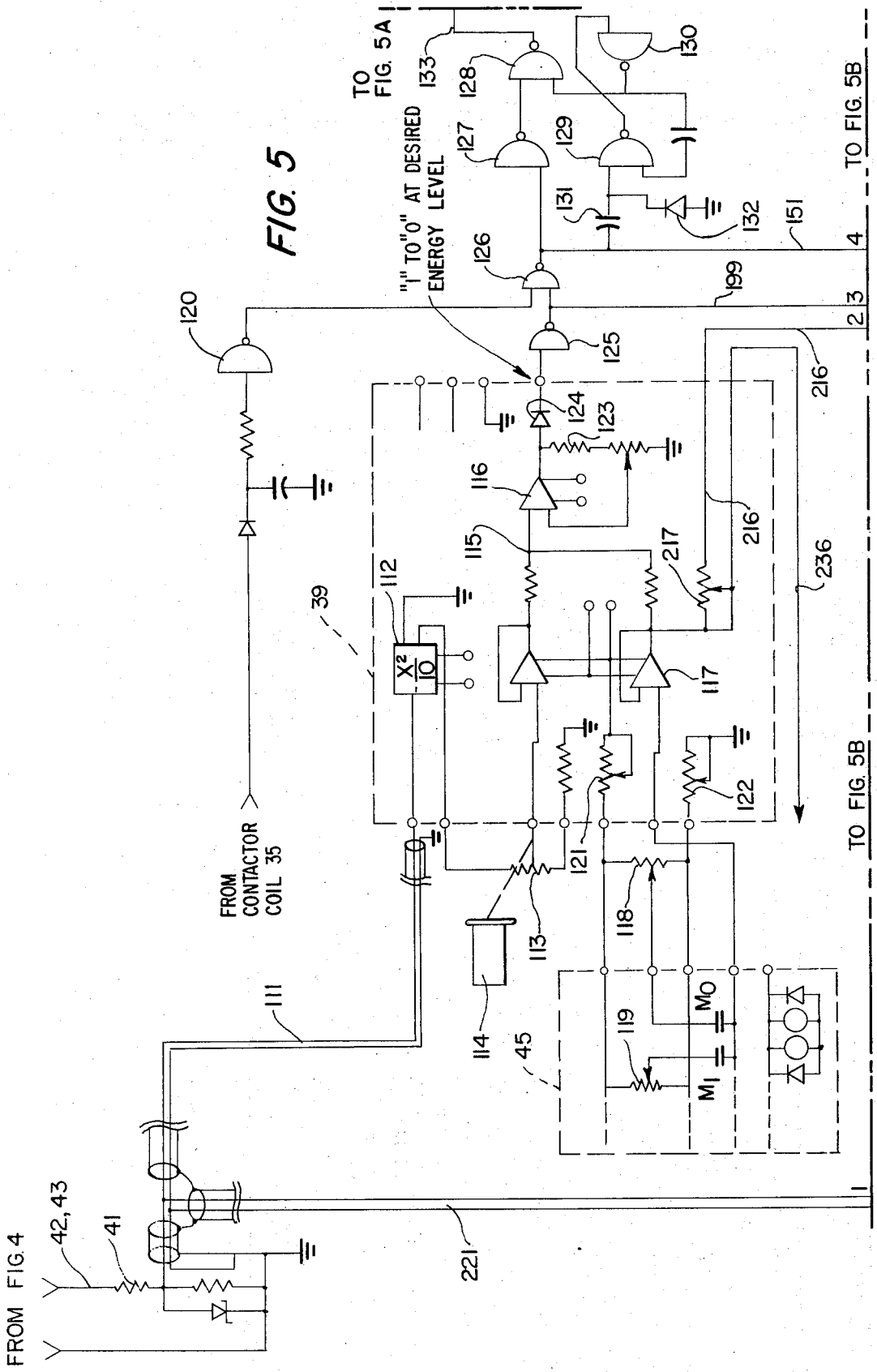

PULSED LASER SYSTEM HAVING IMPROVED ENERGY CONTROL WITH IMPROVED POWER SUPPLY LASER EMISSION ENERGY SENSOR AND ADJUSTABLE REPETITION RATE CONTROL FEATURES

BACKGROUND OF INVENTION

1. Field Of Invention

This invention relates to a high average output power pulsed laser system having an improved energy control and constant current power supply usable with a laser emission energy sensor and adjustable repetition rate control for variably controlling the actual energy level of each pulsed laser emission as well as variably controlling the repetition rate of the pulsed laser emission.

More specifically, the invention relates to a new and improved optically pumped, pulsed, laser system for use in machining and welding, or other similar operations. The system has improved energy control whereby the pulsed laser system can be preprogrammed and variably controlled in terms of the actual energy level of each pulsed laser emission over a predetermined range of values along with adjustable preprogrammed control of the repetition rate of the pulsed laser emissions to thereby provide a unitary and reliable energy controlled laser system 2. Prior Art Developments Since the discovery of laser in the late 1950's, there has been an over increasing interest in the practical application of lasers to the needs of industry. Heretofore, the laser systems that have been used in selected industries have been specifically tailored to the particular needs of the industry in question. While there are a number of different laser system which are available, they have been put together in a somewhat patchwork manner from existing commercially available laser cavities, power supplies, energy storage network, and cooling systems with little or no attention to the proper interfacing of the several subsystems and subcircuits comprising the overall system. Further, the known systems attempt to control the energy of the beam by controlling the voltage to which the energy storage networks are charged with no proper correlation of the voltage level to the actual energy in the laser beam thus making practical machining, welding and other similar operations with the beam more difficult due to the unpredictability of the actual beam energy. For the most part laser machining and welding systems heretofore used have employed optically pumped pulsed laser system principals in order to obtain average output power levels of any appreciable significance. Because of the losses normally incurred in such systems, precise control of the actual laser beam energy has been made doubly difficult. To overcome these difficulties, the present invention was devised.

SUMMARY OF INVENTION

It is therefore a primary object of the present invention to provide a new and improved, pulsed laser system for use in machining, welding and the like, and which employs an improved energy control whereby the pulsed laser system can be preprogrammed and variably controlled in terms of the actual energy level of each pulsed laser emission over a predetermined range of energy values measured in terms of joules of actual energy, along with adjustable preprogrammed control of the repetition rate of the pulsed laser emission to thereby provide a unitary, reliable and general purpose pulsed laser control system.

Another object of the invention is to provide such a control including a laser beam energy sensing arragement for sensing the actual energy of each laser beam emission and thereafter controlling the actual energy level of succeeding laser beam emissions, and also useful in tuning and aligning laser systems generally.

Still another feature of the invention is the provision of a laser system control having an improved means for maintaining temperature stability of the laser cavity and lasing elements such as solid laser rods of glass, etc whereby substantially uniform temperature can be maintained across the cross section of the laser rod to assure uniform energy levels across the cross section of the laser beam emissions.

A further feature of the invention is the provision of an improved energy control power supply particularly adapted for pulsed laser systems or other similar apparatus and which facilitates precise control of the energy level to which a charge storage capacitor network can be charged for subsequent use in exciting a pulsed laser emission of precisely controlled energy values.

Still a further feature of the invention is the provision of an improved trigger control circuit that assures triggering of the laser beam emission only after the energy storage system has been charged to a preprogrammed energy level but which holds off any triggering of the beam at energy levels below the preprogrammed value so that clean cut holes can be drilled or machined and proper welds formed with assurance that dribbling or eroding off of the edges of the holes and welds does not occur due to significant drops in the energy level of the pulsed laser emission at some point within the duration of the emission which otherwise would result in the formation of ragged or improperly formed edges and welds, etc.

Still a further feature of the invention is the provision of a pulsed laser system and control that coordinates automatic workpiece placement by a numerically controlled or other automatically operating workpiece positioning device, and which inhibits triggering of the laser beam for the intervals while the automatic positioning device positions the workpiece in the location required for the next laser beam emission, and which thereafter enables the emission of the laser beam provided other coacting controls are satisfied.

A still further feature of the invention is the provision of a preprogrammed control of the repetition rate of the pulsed laser emission whereby the average output power of the laser system can be severally and jointly controlled by controlling either the repetition rate of the pulsed laser beam emission and/or the energy level of each discrete laser beam emission.

Finally, in addition to the above enumerated desirable features additional protective interlocks are provided to assure personnel safety during maintenance, proper operation of the cooling system, appropriate protective tape safeguards to prevent splattering of the lens elements of the system, manual or repetitive control of the system, etc, and which are essential to the safe and reliable operation of a pumped laser system.

In practicing the invention, a pulsed laser system and control is provided which includes an optically pumped, laser device. For example, a neodymium doped glass rod disposed in a suitable water cooled, optical pumping cavity is provided for producing a relatively high intensity laser beam of coherent light of high energy variable over a predetermined limited range. Optical pumping means in the form of gas filled flash lamps are coupled to the laser device for inducing emission of the laser beam at an energy level which is proportional to the energy level of the output emission from the optical pumping, gas-filled flash lamps. A variable charge capacitor storage circuit is coupled through a pulse forming network to supply electric energy to the optical pumping flashlamps at a charge level that determines the energy level of the stimulated output laser beam. An electric power supply that comprises a monocyclic constant current charging network is energized from a conventional source of electric power and is coupled to and supplies electric energy to the variable charge capacitor storage network. A charging level control circuit is coupled to and controls the operation of the monocyclic, constant current charging network and is comprised by short circuiting crowbar SCR devices which can quickly and safely short circuit the output from the monocyclic constant current charging network to thereby discontinue charging of the capacitor storage network within one tenth of 1 percent of a desired or selected preprogrammed charge level. Because of its inherent nature, the monocyclic, constant current charging network operates to recirculate the short circuited current back to its power supply source so that only the electric energy required to charge the capacitor storage network is drawn from the power source thereby resulting in an extremely efficient overall system.

A voltage sensing network in the form of voltage dividing resistors is coupled across the capacitor storage network for sensing the voltage level to which the capacitor storage network is charged and analogue computation circuit means is coupled to the voltage sensing network for converting the sensed voltage into a signal representative of the total actual energy stored in the capacitor storage network measured in terms of joules of energy. This sensed stored energy signal is then used in controlling operation of the short circuiting crowbar SCR to cause them to conduct and automatically discontinue charging of the capacitor storage network at a desired stored energy level.

A comparison circuit means is provided as part of the feedback control system from the output of the energy computation circuit means and an energy level selector programming means is provided for supplying to the comparison circuit means an input command desired energy level value to which the capacitor storage network circuit is to be charged. The command value of energy level is supplied to the comparison circuit means in conjunction with the output from the measured energy computation circuit means for comparison in the comparison circuit means and for deriving an output feedback control signal upon the sensed or measured energy level of the capacitor storage network equalling the command value of energy. This feedback control signal is then employed in the control of the short circuiting, crowbar SCR's that control charging of the capacitor storage network from the monocyclic, constant current charging network in a fast responding manner. Additionally, trigger circuit means are coupled to and control operation of the optical pumping, gas filled flash lamps for initiating operation of the optical pumping flash lamps. Trigger inhibit circuit means are coupled to and control operation of the trigger circuit means and the trigger inhibit circuit means in turn are coupled to and controlled by the output from the comparison circuit means for inhibiting triggering of the pumping means until the energy level obtained by the capacitor storage network achieves the programmed value set by the energy level selector programming means. By this further control, it is assured that no laser beam emission will occur until there is adequate energy stored in the capacitor storage network to provide proper machining, welding, etc.

In addition to the above features, the preferred laser system control further includes means disposed in the optical path of the laser beam for diverting a fractional portion of the beam and photosensitive means in the form of a photodiode responsive to the diverted fractional portion of the laser beam for deriving a sensed actual laser beam energy feedback signal. Compensating circuit means are responsive to the output from the photodiode and is operative to modify the operation of the comparison circuit means for appropriately compensating the stored energy level in the capacitor storage network in accordance with the value of the sensed actual laser beam energy feedback signal whereby losses incurred in the high power pulsed laser system are compensated by adjusting the stored energy level of the capacitor storage network to a value sufficient to make up for such losses. Additionally, a laser beam heat sink, is provided together with laser beam diverting means which are rotatable into the path of the laser beam for diverting the laser beam from its normal optical path and projecting it into the laser beam heat sink. Beam diverter control means are provided for controlling movement of the laser beam diverter means, and beam diverter inhibit and enabling signal generating means are coupled to and control at least in part the trigger inhibit circuit means for inhibiting operation of the trigger circuit during intervals while the laser diverter means is being moved into or out of the laser beam optical path, and for enabling the trigger inhibit circuit means upon the beam diverter assuming a commanded, desired position relative to the laser beam optical path. Additionally, inhibit and enabling circuits are provided for the protective tape used to protect the optical lens elements of the laser system from spattered molten particles, spray and gases emanating from the workpiece, to provide manual as well as automatic repetitive triggering of the laser beam emission, to automatically sense and operate protective devices in the event of a cooling system failure, to provide personal safety interlocks during servicing of the equipment, and other similar, necessary controls.

To provide adjustable, preprogrammed control over the repetition rate of the pulsed laser emissions, resettable, variable repetition rate trigger pulse generating circuit means are provided which operate through the trigger inhibit circuit means in conjunction with a repetition rate selector programming means to inhibit the trigger circuit means at least in part so as to assure minimum desired intervals of time between each triggered operation of the laser system.

As a part of the above controls, a laser system controller is provided which includes the photosensitive device responsible to a fractional portion of the laser beam for developing the output control signal representative of the actual energy of the laser beam. Summing circuit means are responsive to the output signal from the photosensitive device and to an input reference level signal representative of the desired energy level of the beam, and operates to derive an output signal indicative of the magnitude and polarity of any difference. A stepping motor means is responsive to this output signal and drives a potentiometer that develops a semi-fixed feedback reference signal representative of the value of the laser beam energy, and which is retained at a set value from one laser beam emission to the next. Polarity sensitive circuit means responsive to the summing circuit means enable the stepping motor means to cause it to step the potentiometer up or down, and a bipolar staircase signal generator derives a signal synchronously with the stepping action of the potentiometer that is applied back to one of the summing inputs of the summing amplifier in a sense to drive the magnitude of the error signal at the output of the summing amplifier towards zero in response to the stepping action of the stepping motor (and hence potentiometer), whereupon the stepping action of the stepping motor will be stopped.

BRIEF DESCRIPTION OF DRAWINGS

These and other objects, features and many of the attendant advantages of this invention will be appreciated more readily as the same becomes better understood by reference to the following description, when considered in connection with the accompanying drawings wherein like part in each of the several figures are identified by the same reference character, and wherein:

FIG. 2 is a schematic diagram of the several sheets of the drawings illustrating how they are to be arrayed to best portray the construction of the overall system and circuits which they illustrate;

FIG. 4 is a detailed circuit diagram illustrating the construction of the combined capacitor storage and pulse forming network charged from the three phase, monocyclic constant current charging network shown in FIG. 3, and used to excite the gas filled flash lamps employed for optically pumping the laser device of the system;

FIG. 4A is a voltage versus time characteristic curve illustrating the nature of the voltage triggering pulse supplied from the capacitor storage and pulse forming network of FIG. 4 to the electrodes of a gas filled flash lamp employed in pumping the laser device of the system;

FIGS. 5, 5A, 5B and 5C comprise an overall, detailed, schematic circuit diagram of the energy level sensing and detecting circuits, the energy computation circuit, the repetition rate programming and signal generating circuit, the sensed actual energy compensation network, and the various inhibiting controls employed in the overall system of FIGS. 1–1B;

DETAILED DESCRIPTION OF PREFERRED EMBODIMENTS

Figure 1:
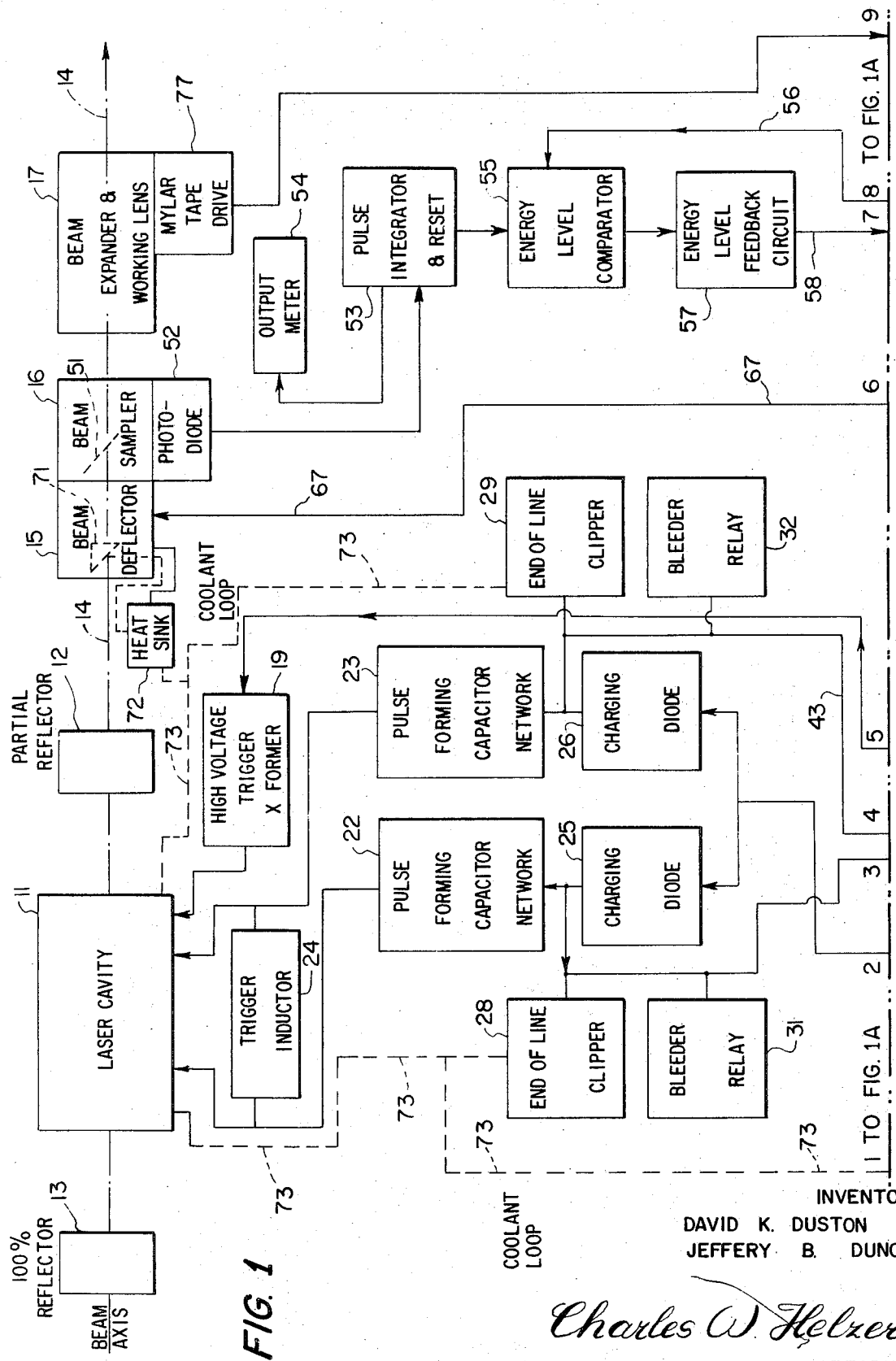
FIGS. 1, 1A and 1B comprise a functional block diagram of an overall laser system and control in accordance with the invention when arrayed in the manner depicted in FIG. 2 of the drawings.
Figure 1A:
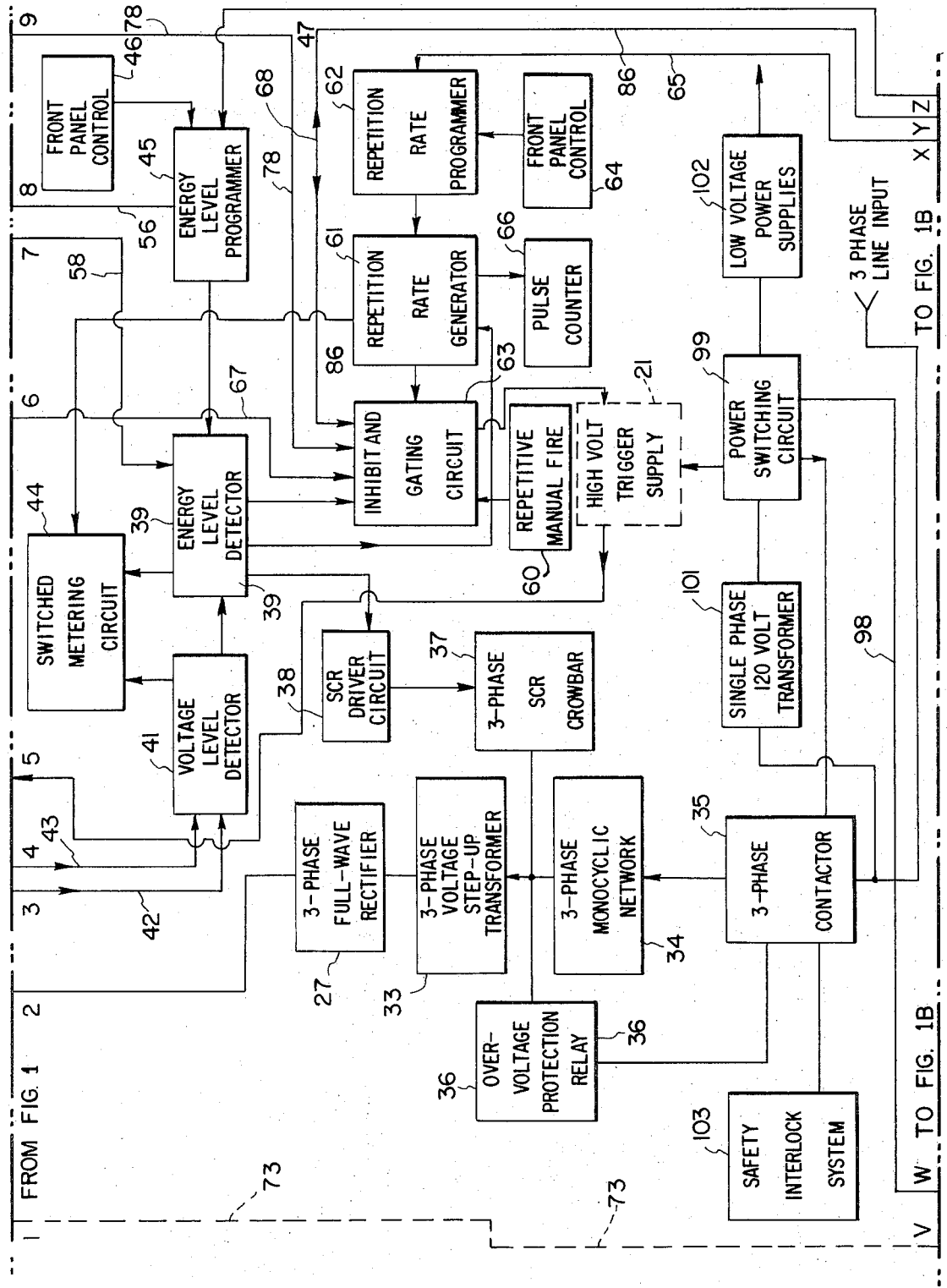
Figure 1B:
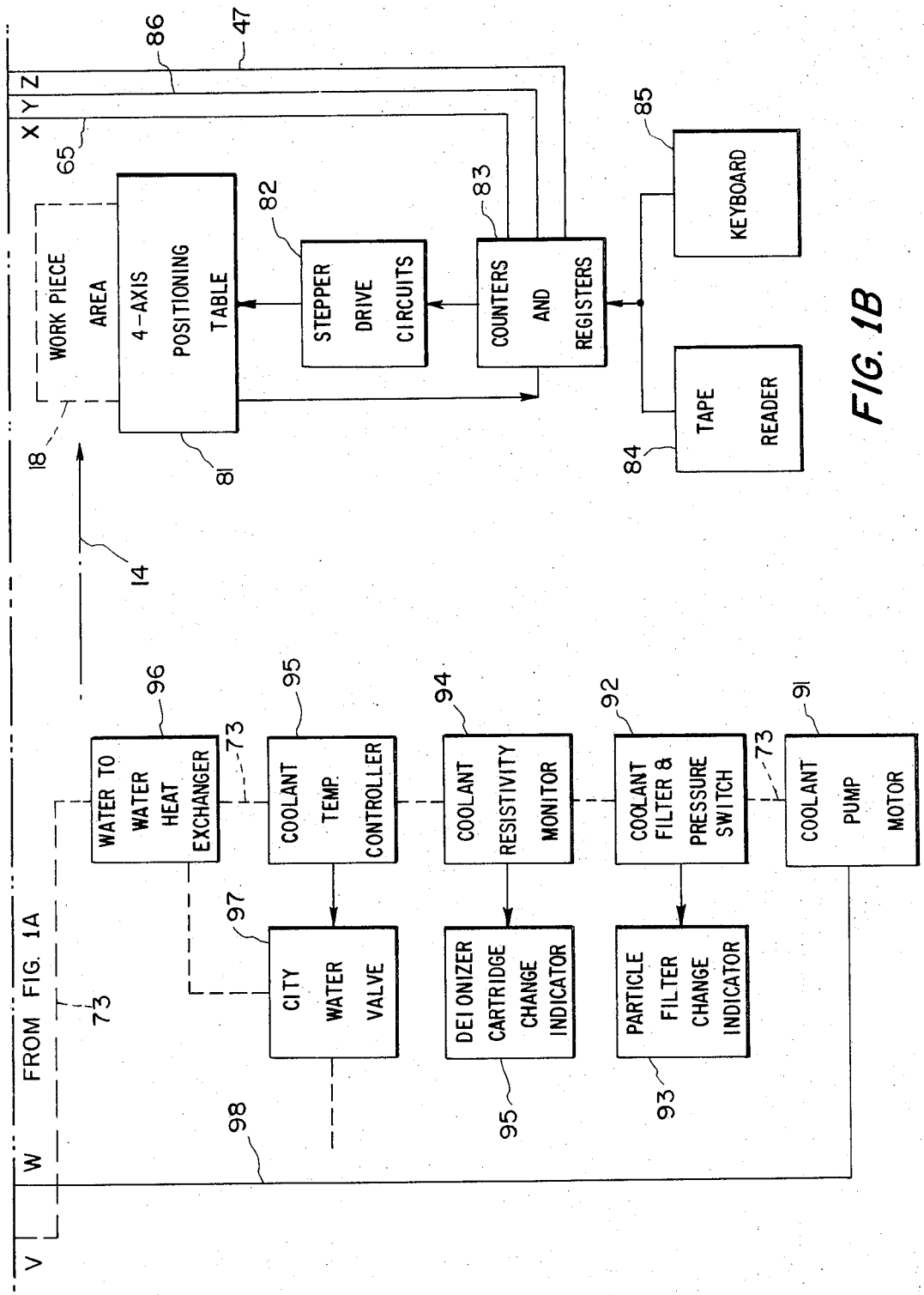

FIGS. 1, 1A and 1B when arrayed in the manner depicted in FIG. 2 of the drawings comprise an overall functional block diagram illustrating the novel features of the present high average power pulsed laser system having improved energy control with improved fast responding power supply, laser emission sensor and adjustable repetition rate control features constructed in accordance with the invention. In FIG. 1, a laser cavity is shown at 11 having disposed within it a suitable laser rod such as a neodymium doped laser rod of the type manufactured and sold by the American Optical Company and described in an article published in Laser Focus on December 1967 by Advanced Technology Publications Inc of Newtonville, Mass. The laser cavity encloses a pair of gas filled flash tubes which upon being ignited, optically pump and excite the atoms of the neodymium doped glass rod to cause it to laze whereby it emits a coherent light beam of monochromatic light of a characteristic wave length typical to neodymium doped glass rods. For a more detailed description of the construction of the laser cavity 11 and flash tube pumping arrangement reference is made to Chapter 14 of the textbook entitled "Laser - Lichtverstaerker Und Oszillatoren" by D. Roess - 1966 published by Akademische Verlagsgesellschaft-Frankfurt, Germany. It should be noted however that while the above mentioned elements have been described for the purpose of illustrating a typical construction, the invention is in no way limited to use with optically pumped laser devices of this exact nature, but could be practiced with any suitable pulsed laser device. In operation, upon excitation from the optical pumping flash lamps, light emitted by the ruby rod is partially reflected by a partial reflector 12 and 100 percent reflected by a 100 percent reflector 13 back and forth through the laser cavity 11 building up in amplitude with each succeeding passage. After a number of such reflected passages, the wave grows in intensity until it is sufficiently strong to have its gain exceed the losses thereby producing a pulsed laser beam emission of coherent light. This pulsed laser beam emission travels along the laser beam optical axis indicated at 14 through a first full beam deflector housing 15 and a partial beam deflector 16 to a beam expander and working lens arrangement 17 where it is focused and imaged upon a workpiece supported in a workpiec area 18 (shown in FIG. 1B). To ignite the optical pumping flash tube and thereby excite the pulsed laser emission, a high voltage trigger pulse is supplied to the trigger electrodes of the gas filled flash tubes from a high voltage trigger transformer 19 that in turn is controlled from a high voltage trigger supply circuit 21 shown in FIG. 1A.

The pumping flash tubes enclosed in laser cavity 11 are supplied from respective pulse forming capacitor storage networks 22 and 23 which are connected across the input terminals to the flash tubes for applying a high pulsed current of the order of several thousand amps for a short time duration upon the flash tubes being triggered into conduction by the application of a high voltage triggering potential supplied from the high voltage trigger transformer 19 to the trigger electrodes of the flash tubes. Preferably, a trigger inductor 24 is coupled across the two flashtubes each of which is supplied separately from the respective pulse forming capacitor storage networks 22 and 23, and serve to assure balanced excitation of both flash tubes. The pulse forming capacitor networks 22 and 23 are charged to a predetermined energy level through respective charging diodes 25 and 26 that in turn are connected in parallel to the output of a three phase fullwave rectifier 27 shown in FIG. 1A. To assure proper operation of the pulse forming capacitor storage networks 22 and 23, respective end of line clipper circuits 28 and 29 are provided along with respective bleeder relays 31 and 32. The end of line clippers 28 and 29 operate to clip off any negative going currents that might be developed in the pulse forming capacitor networks 22 and 23 due to oscillatory affects in the network, and the pulse forming network properly shapes the out going voltage pulses supplied from the networks to the respective flashtubes into an essentially square waved positive going current pulse. The bleeder relays 31 and 32 operate when the power supply shuts down, the contactor 35 opens, and charging ceases. The bleeder relays discharge the pulse forming networks and maintain them at zero voltage as long as contactor 35 remains deenergized.

As shown in FIG. 1A, the fullwave rectifier 27 is a three phase fullwave rectifier supplied from a three phase voltage step up transformer 33 that in turn is supplied from a three phase monocyclic constant current charging network 34. The monocyclic constant current charging network 34 in turn is supplied through a conventional three phase contacter 35 from a three phase, 60 cycle, 480 volt, conventional commercial alternating current power source (not shown). The three phase contactor 35 is a conventional relay actuated contactor which is normally closed upon placing the equipment in operation and opened in order to deactivate the equipment. An over voltage protective relay 36 also is connected to and may open the three phase contactor 35 to discontinue operation of the equipment in response to an over voltage condition being detected. As will be explained more fully hereinafter in connection with FIG. 3 of the drawings, the three phase monocyclic constant current charging network 34 operates at a relatively low voltage of the order of 480 volts to charge the pulse forming capacitor storage network 22 and 23 to a preselected energy level through the charging diodes 25 and 26, fullwave rectifier 27 and step up transformer 33. The step up transformer 33 serves to step the voltage up to a desired higher value above 480 volts, to a value substantially higher than 480 volts of the order of 6,000 volts, for example. As will be explained more fully hereinafter, by sensing the voltage level built up across the storage capacitors, precise control of the energy of a resultant pulsed laser emission can be achieved. The monocyclic constant current charging network 34 constitutes a true constant current source so that its output may be safely short circuited with no ill effects. Upon short circuiting, the output current simply flows through the short circuit and the output voltage (and hence output power) drops instantaneously to zero. This property facilitates quick turn-off of the charging current to the pulse forming capacitor storage networks 22 and 23 by merely turning a switching device on. For this purpose, three phase, short circuiting SCR crowbar circuits shown at 37 are employed. Since an SCR device can be turned on far more easily and rapidly than it can be turned off, it is possible to stop the charging from the lower voltage monocyclic constant current charging network much more precisely than is possible with other techniques. Due to the fact that the pulse forming network is charged at a constant current, no current-limiting resistors are required, and the overall supply efficiency can be quite high of the order of 85–90 percent and the only power drawn from the three phase source supplying the system is that required to charge the capacitors. Because of the quick turn-on characteristics of the short circuiting SCR crowbar circuit, accuracy in controlling the charge level of the pulse forming capacitor storage networks is of the order of one half of 1 percent at capacitor discharge repetition rates up to about 15 pulses per second. This accuracy will drop somewhat to the order of 2–3 percent at discharge repetition rates from 15 to 40 pps.

In order to precisely control turn-on of the short circuiting SCR crowbar circuit 37, an SCR driver circuit 38 is provided which in turn is responsive to the output from an energy level detector circuit 39. The energy level detector circuit 39 will be described more fully hereinafter in connection with FIG. 5–5C and in turn is responsive to the output from a voltage level detecting circuit 41 that is connected through conductors 42 and 43 to sense the value of the voltage being built up across the respective pulse forming capacitor storage networks 22 and 23. As will be explained more fully hereinafter in connection with FIGS. 5–5C the energy level detector circuit 39 includes an analogue computation circuit for converting the voltage reference signal from the voltage level detector 41 into an energy referenced signal measured in terms of joules for use in controlling the operation of the SCR driver circuit 38 and hence turn on of the short circuiting SCR crowbar circuit 37. A switched metering circuit shown at 44 whose input can be switched between the voltage level detector 41 and the energy level detector 39 can be used to provide a visual indication of either voltage level or the energy level to which the pulse forming capacitor storage networks 22 and 23 are charged.

The energy level detector 39 includes within it a comparison circuit for comparing the sensed value of the stored energy in the pulse forming capacitor storage network to a preprogrammed selected value of energy level read into the system through an energy level programmer 45 that in turn may be controlled from a key board, terminal plug board, punched or magnetic tape unit, or other similar device that comprises a front panel control unit 46 to which an operator of the equipment has access for programming purposes. In addition to the front panel control inputs, the energy level programmer 45 also receives inputs over a conductor 47 from a numerically controlled automatic workpiece positioning device shown in FIG. 1B for a purpose to be explained hereinafter. The energy level program of 45 supplies a preselected value of energy level to which the pulse forming capacitor storage networks are to be charged to the comparison circuit in the energy level detector 39 in conjunction with the measured actual value of stored energy in the capacitor storage networks. The comparison circuit then operates to compare these two values and upon deriving an indication that the two values are equal automatically fires the SCR driver circuit 38 so as to discontinue charging of the pulse forming capacitor storage networks in the previously described manner.

There are a number of inefficiencies that can be encountered in the practical operation of an optically pumped, pulsed laser system such as that herein disclosed which make impractical any open loop operation of the system based on desired energy level inputs alone. One of the more prominent of the inefficiencies introduced is that caused by aging of the flashtubes. As the flashtubes age, their luminosity decreases for a given amount of excitation so that it is necessary continuously to increase the excitation in order to compensate for the decreasing luminousity due to aging. Other similar effects such as accumulation of dust in the laser beam optical path, etc can affect the actual energy value of the pulsed laser emission. To compensate for these total effects, the beam sampler 16 shown in FIG. 1 is provided. Beam sampler 16 includes a means comprised by a half-silvered mirror 51 disposed in the normal optical path of the laser beam for partially diverting a fraction (of the order of 1 percent or less) of the beam, and causing the fractional portion of the laser beam to be imaged upon a photosensitive sensing element comprised by a photodiode 52. Photodiode 52 has its output supplied to a pulsed integrator and reset circuit 53 whose output in turn may be metered by a suitable metering instrument 54 to provide a directly viewed visual indication of the actual pulsed laser emission energy level. Additionally, the output from the pulse integrator and reset circuit 53 is supplied to an energy level comparator circuit 55 along with a preprogrammed selected value of actual laser beam energy level supplied over conductor 56 from the energy level programmer 45 in FIG. 1A. The energy level comparator circuit 55 then operates to compare the sensed actual value of the energy level of the laser beam emission to the preprogrammed desired value and derives an output error signal indicative of the magnitude and polarity of any difference. This output error signal is then fed back through a semi-fixed energy level reference feedback circuit 57 and conductor 58 to the energy level detector 39. This semi-fixed energy level reference feedback signal is semi-fixed in that it is retained in quasi-memory form from one laser pulse emission to the next, and is used in the energy level detector circuit 39 to compensate the output signal controlling SCR driver circuit 38 in such a direction as to compensate for any losses in the laser system by appropriately adjusting the stored value of the energy in the pulse forming capacitor storage network 22 and 23. Thus, if the preprogrammed selected value of stored energy applied from energy level programmer 45 calls for a first stored energy value in the pulse forming capacitor storage network 22 and 23 which in actuality does not result in the desired actual laser beam energy level, the compensation fedback through the photodiode 52 and energy level reference feedback circuit 57 automatically will compensate the charge level to which the pulse forming capacitor storage networks 22 and 23 are charged in order to make up for such losses.

In addition to variably controlling the energy level of each discrete pulsed laser emission between values of the order of 1 joule to 500 joules, the laser system comprising the invention further includes means for variably controlling the repetition rate of the pulsed laser emissions. This means is comprised by a repetition rate generator 61 that in turn is controlled by a repetition rate programming means 62 for controlling the repetition rate of trigger pulses derived by the repetition rate generator and used to trigger the high voltage trigger supply 21 through the intermediary of an inhibit and gating circuit 63. The repetition rate programmer 62 may be controlled by a keyboard, plugboard, punched card unit, punched or magnetic tape unit that comprises a front panel control 64 operated by an operator of the laser system, or alternatively may be under the control of a numerically controlled workpiece automatic placement machine for automatically placing a workpiece with respect to the laser beam optical axis and supplying command values for the desired repetition rate over the conductor 65 directly to the repetition rate programmer 62. The inhibit and gating circuit 63 receives input control signals not only from the repetition rate generator 61 but also is under the control of the output derived from the energy level detector 39 as well as additional inhibiting control supplied over conductors 67 and 68 as will be described hereinafter. A detailed description of the construction and operation of the inhibiting and gating circuit 63 likewise will be described more fully hereinafter in connection with FIGS. 5-5C of the drawings. Desirably, a pulsed counter 66 is connected to the output from the repetition rate generator 61 for deriving an output visual indication of the relative age of system components as represented by the number of laser pulses generated and counted.

In addition to the beam sampler 16, a beam deflector 15 is physically disposed along the normal optical path of the laser beam emitted by laser cavity 11 and includes a rotatable prism shown at 71 which may be rotated totally out of the optical path of the laser beam, or alternatively may be rotated into the path of the laser beam. Where the prism 71 is in a position out of the path of the laser beam, it is allowed to pass through the beam expander and working lens arrangement 17 is imaged upon a workpiece. Where the prism 71 is rotated into the path of the laser beam, the beam will be imaged downwardly into a heat sink shown at 72 where its energy will be absorbed by cooling water circulated in the heat sink through a coolant loop depicted by the dotted lines 73. By this means than the laser beam can be caused to be imaged on the workpiece or alternatively into the heat sink. Because it is essential to know that the beam deflector prism 71 is in a desired command position, feedback signals indicative of the position of the beam deflector are supplied back over conductor 67 as one of the inhibiting and enabling inputs to the inhibit and gating circuit 63. This feedback connection, as will be described more fully hereinafter, includes logic circuits for ascertaining that the beam deflector is positioned where it has been commanded to be positioned, and is not in the process of moving the optical path of the beam from the heat sink to the workpiece or vice-versa. By thus inhibiting the triggering of the laser pumping flashtube with the beam deflector position feedback signal supplied along conductor 67, the production of a pulsed laser emission during movement of a beam deflecting prism, is prevented. The provision of the beam deflector 15 allows the laser system to be operated continuously during intervals while a workpiece is being positioned either manually or automatically in proper relationship to the laser beam optical axis. During such intervals, the laser beam will be deflected by the beam deflecting prisms 71 down into the heat sink, and the laser will be continuosuly fired at the programmed repetition rate. In this manner thermal stability of the laser system is achieved at the command values of energy levels and repetition rate which are to be used with respect to the workpiece. It is known that where either the repetition rate or energy level of an optically pumped neodymium-glass rod is changed, thermal gradients may be produced across the cross section of the rod which will adversely affect the energy cross section of the pulsed laser emission so as to result in irregularities. To avoid these irregularities the beam deflecting means is included, and the laser continuously operated at the programmed values of energy levels and repetition rate so as to thermally stabilize the neodymium-glass rod at these values. Hence, upon the beam deflector being rotated out of the path of the laser beam, the resultant pulsed laser beam emission which impinge upon the workpiece will not have thermally induced irregularities as explained above. As a consequence, clean cut holes, welds and the like can be formed because of the regularity of energy in the cross section of the emissions.

The laser beam after passing through the beam expander and working lens is finely focused and imaged onto a workpiece disposed in the workpiece area shown generally at 18 in FIG. 1B. Because of the high energy content of the laser beam, and the nature of certain materials that can be machined or welded with the laser beam, it is predictable that a considerable amount of spattering, spraying and gases will be driven off from the workpiece. Should this spattered material be allowed to accumulate on the working lens arrangement it could substantially impair the operation of the system. To avoid this, conventionally, a clear mylar protective tape is arranged over the working lens between the workpiece and the working lens and is moved stepwise between each pulsed laser emission so as to position a new clear piece of protective tape between the working lens and the workpiece for each new pulsed laser emission. For this purpose, the system is provided with a mylar tape drive 77 which has connected to it a protective tape movement signal generating circuit that supplies an output inhibiting signal over the conductor 78 for application to the inhibit and gating circuit 63. This signal will operate to inhibit triggering of the high voltage trigger supply 21 for so long as the protective tape is being moved. Upon a new clear piece of the tape being moved into the working position protecting the working lens an enabling signal will be supplied over the conductor 78 which releases the inhibit and gating circuit 63 from the inhibit imposed on the circuit during movement of the tape.

The workpiece is supported in the workpiece area 18 on a four axis positioning table shown generally at 81 the four positioning axes are comprised by three orthogonal axes and a rotational axis for proper placement of a workpiece being machined with respect to the optical axis 14 of the pulsed laser emissions. It is preferred that this workpiece positioning table be driven automatically by a numerically controlled machine including the stepper drive circuits 82 the counters and registers 83 which are controlled either from a magnetic or punch tape reader 84 or alternatively by a manually operated keyboard 85. The keyboard 85 and/or tape reader 84, counters and registers 83 and separate drive circuits 82 may all comprise conventional digitally operable circuits for automatically driving the positioning table 81 to a series of preprogrammed machining positions relative to the laser beam optical axis 14 in accordance with preprogrammed tape or keyboard punched instructions read into the counters and registers 83 from the tape reader 84 and/or the keyboard 85 by an operator of the laser system. The counters and registers 83 generate the required repetition rate command values and energy level command values, which are then supplied over the conductors 64 and 47 respectively for controlling the repetition rate programmer 62 and energy level programmer 45, respectively. Additionally, the counters and registers 83 supply an additional inhibit and enabling control signal over the conductor 86 to the inhibit and gating circuit 63 for inhibiting triggering of the high voltage trigger supply 21 (and hence emission of the pulsed laser beam) for so long as the automatic positioning table 81 is not in a desired command position in accordance with the preprogrammed construction, or is in the process of moving to a new desired command position. Upon the workpiece assuming a new desired command position and ready to be worked with the laser beam, an enabling signal is provided to the inhibit and gating circuit 63 which then releases control over the triggering of the high voltage supply 21 to other associated controls of the system as will be explained more fully hereinafter in connection with FIG. 5–5C of the drawings. Copending application Ser. No. 133,522, filed Apr. 13, 1971 —Richard F. McRay, Inventor for "Laser Working Machine With Workpiece Support" describes a suitable workpiece support for use in the present system.

As stated earlier during intervals while the laser beam is not imaged on a workpiece, it is deflected by the beam deflector 15 directed. into a water cooled heat sink 72. The heat sink 72 is supplied with cooling water through the conduits 73 that also serve to cool the laser cavity and the end of line clipper diodes 28 and 29, and are supplied from a coolant system shown in FIG. 1B. The coolant system comprises a closed cooling system through which water is circulated by a coolant pump 91 for circulating the cooling water through a particle filter 92 having a pressure sensitive switch coupled across the coolant filter for detecting excessive build up of particles or clogging of the filter. Upon the filter becoming clogged with particles a back pressure will build up which actuates the pressure switch and provides a readout indication on the particle filter change indicator 93. From the coolant filter 92, the coolant then flows through a coolant resistivity monitor 94 which electrically measures the resistivity of the water, and in the event it becomes to highly ionized, actuates a deionizer cartridge change indicator shown at 95. From the coolant resistivity monitor, the coolant flows through a coolant temperature controller 95 and water to water heat exchanger 96. Where the coolant temperature controller determines that the temperature of the coolant in the closed loop cooling system is too high, it will actuate a city water valve 97 for increasing the cooling water to the heat exchanger 96, or alternately decrease it to maintain the temperature of the coolant in the closed cooling system at a substantially constant value. The city water valve 97 may be connected directly to a residential water supply of a sufficiently low temperature to constitute an adequate cooling medium for the water to water heat exchanger 96 so as to assure adequate cooling of the coolant used in the closed loop cooling system. For convenience, the deionizer cartridge change indicator 95 and particle filter change indicator 93 preferably are mounted on a front control panel such as is indicated at 64 for ready observation by an operator of this system. By this arrangement, where the need for a deionizer cartridge changer or a particle filter change is signaled, the system can be closed down and the necessary deionizer of filter element changes made so as not to endanger the equipment due to failure of the cooling system. Without these additional safety features, the laser cavity or other elements of the system conceivably might be operated without adequate cooling and could result in permanent damage to the system.

In order to electrically drive the coolant pump motor 91, the pump motor is supplied over a conductor 98 through a low voltage power switching circuit 99 from a single phase 120 volt power supply transformer 101 connected to two of the three phase input lines supplying three phase contactor 35 and the three phase monocyclic constant current charging network 34. The power switching circuit 99 in addition supplies low voltage excitation power to the three phase contactor 35, and a low voltage power supply 102 that supplies low voltage direct current excitation potential to all the signal level circuits employed in the system. Additionally, a safety interlock 103 may be employed with the three phase contactor 35 for assuring safe operation and maintenance of the laser system. For example, the doors providing access to the interior of the cabinets housing the high power sections of the laser system all are provided with safety interlock switches which switch off the power supply through three phase contacter 35 upon the doors of the cabinets being opened while the system is in operation. In this manner safety of the personnel attempting to service the equipment can be assured. Additional safety interlocks also are provided for assuring discharge of the pulse forming capacitor storage network following shut down in advance of servicing of the system. Additional safety interlocks also are provided for a variety of safety control features similar to those enumerated above.

From the above brief description of FIGS. 1–1A it will be appreciated that the inhibit and gating circuit 63 in fact constitutes a central control circuit which in effect coordinates the functions of all the different individual subsystems and components that comprise the overall laser system. As a result, proper functioning of the system is assured by properly coordinating the operation of all of the various subsystems and components and results in protecting the complete system in the event of a malfunction or failure of one or more of the system components as well as protecting the operator, and the workpiece.

In normal operation the following sequence typically would be followed where a system has been preconditioned for repetitive operation at a preprogrammed selected repetition rate within the range of repetition rates selectable. Assuming that the three phase contactor has been closed and that none of the safety interlocks or monitors has been activated so as to indicate a malfunction condition and that the system otherwise is ready for operation. Upon this occurrence, the power supply will start charging the pulse forming capacitor storage networks 22 and 23 toward the desired energy storage level set by the energy level programmer. Concurrently, the workpiece will be moved into position relative to the optical axis of the laser in front of the working lens 17 so as to be conditioned for the drilling, welding, or other similar operation to be conducted on the workpiece. The automatic workpiece position control normally will operate at a speed fast enough to accomplish proper positioning in the interval of time allowed between the repetitive pulse laser emissions. However, where this is not the situation, it is conceiveable that the beam deflector will have been operated to deflect the laser beam off of its normal axis and into the heat sink 72 in order to allow adequate time for the automatic positioning control to place the workpiece in a proper position relative to the laser beam optical axis for the next pulsed laser emission. Upon this condition being satified, the inhibit placed on the gating circuit 63 by the automatic position control will be removed and the gate circuit enabled insofar as that particular subsystem is concerned.

Upon the charge level in the pulse forming capacitor storage network 22 and 23 attaining the preprogrammed selected value established by the energy level programmer, the energy level detector 39 will release its inhibit on the gating circuit 63 and allow the high voltage trigger supply 21 to trigger the pumping flashlamps provided that all other conditions required for proper triggering have been satisfied. It is assumed that the laser system previously has been operated so that the beam sampler 16 has derived through photodiode 52 a measurement of the actual beam energy and has operated back through the pulse integrator 53, energy level comparitor 55 and energy level feedback circuit 57 so as to properly compensate for losses incurred in the laser cavity and other parts of the optical system. Concurrently with the charging of the pulse capacitor storage networks 22 and 23, the mylar tape drive 77 will have driven a new clear piece of protective tape into position in front of the working lens 17 so that, that subsystem is conditioned for operation and enabling signal has been supplied over conductor 78 to the inhibit and gating circuit 63. Similarly, it is assumed that the beam deflector 71 is in a desired commanded position out of the laser beam and that a suitable enabling signal has been supplied over conductor 67 to the inhibit and gating circuit 63. Thus, it will be seen that substantially the only other condition to be satisfied is that dictated by the selected repetition rate set by the repetition rate programmer 62 and repetition rate generator 61. A significant factor determining the maximum repetition rate at which the laser system may be pulsed, is the interval of time (sometimes referred to as the deionization time) during which it is required that the output from the charging supply remain zero while the flashtube employed to optically pump the laser regain their ability to hold-off voltage. Depending upon the specific flashlamp employed and the peak current used to operate the lamps, the required delay time may vary anywhere from 3 to 25 milliseconds. At the faster repetition rates, this delay time may become a significant proportion of the time available between laser discharges. However, in any event, it is essential that the repetitive pulses be delayed for at least this critical time period at a selected value of energy output. Thus, the provision of a repetition rate generator control that assures at least this minimum time interval at a selected energy output value, is provided. Assuming then that all other inhibits on the operation of the gating circuit 63 have been satisfied and the circuit enabled, then the production of a trigger pulse from the repetition rate generator signals the circuit that an adequate time period has passed following the preceding pulsed laser emission, and that the production of a pulsed laser emission at this point in time is in order.

From the foregoing brief discussion, it will be seen that the system control has determined that the workpiece is in position, the stored energy in the pulse forming capacitor storage network has attained a desired value including compensation for losses incurred in the system, and that charging has ceased, the beam diverter is out of the optical path, the protective tape has properly positioned a new clear piece of tape in the optical path for protecting the working lens, and the required minimum time interval between laser pulses has expired. Then and only then will a pulsed laser emission be produced.

Along with the above briefly described central controlling function, monitoring is provided for possible malfunctions that could occur in the cooling system used to carry heat away from the laser cavity, flashtube and laser rod as well as the heat sink if it is used. If the coolant circulating pump should fail or the closed cooling system otherwise become blocked, the laser cavity, laser rod or other components could be severely damaged, possibly irreparably. Consequently, the cooling system is monitored and the operator of the system provided with an indication should certain essential cooling system functions fail in order that the power supply be turned off. In addition to monitoring the normal energy level at which the power supply operates, providing suitable cabinet door interlocks to prevent electric shock while servicing, laser burns and the like, other controls are provided in order to assure safe operation of the system.

Where high speed processing or complex machining or welding operations are involved, it is desirable that the energy level and the laser repetition rate be programmable by a numerical control unit which also should numerically control the position of the beam diverter. In this way, the operator of the equipment could program not only the positioning sequence for the workpiece but the entire system operating sequence including the energy level and laser repetition rate for selected cuts or welds. All that is required is that the operator merely insert a preformed control tape and workpiece. Thereafter, all that he needs to do is to press the start button and properly observe the system monitor output to assure proper functioning of the coolant system, power supply, etc.

Figure 3:
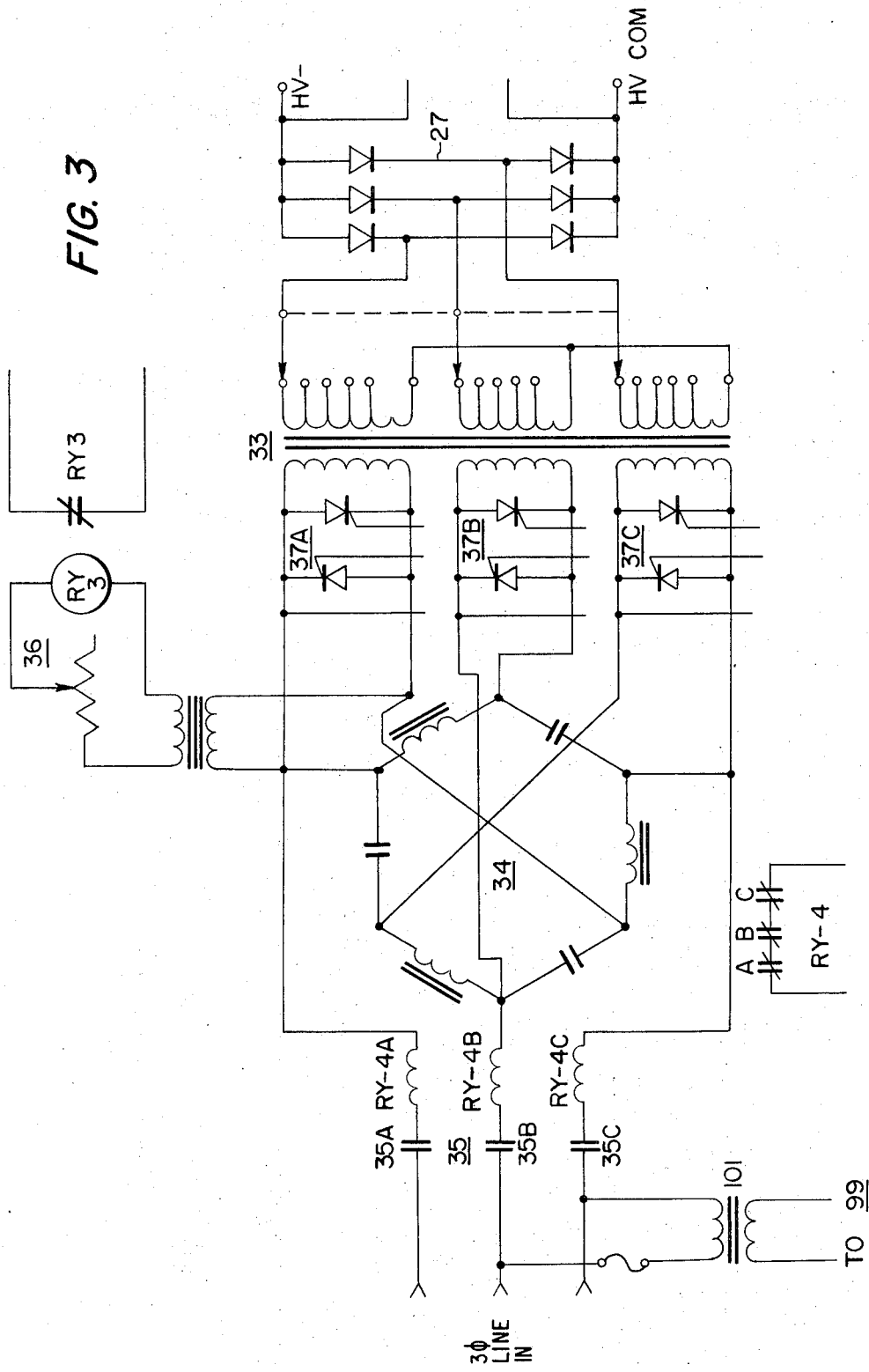
FIG. 3 is a detailed schematic circuit diagram of a three phase monocyclic, constant current charging network intercoupled with a three phase step up voltage tranformer and three phase, fullwave rectifier network together with short circuiting crowbar SCR's connected across the output of the monocyclic constant current charging network and constructed in accordance with the invention.

FIG. 3 is a detailed schematic circuit diagram of the monocyclic constant current charging network 34, the three phase voltage step up transformer 33 and the three phase fullwave rectifier 27 all of which comprise conventional, known elements and need not be described in detail. The short circuiting crowbar SCRs are shown at 37A, 37B and 37C as comprising commercially available silicon control rectifiers of a suitable power rating connected across the primary phase windings of the three phase voltage step up transformer 33. It will be noted that the secondary phase windings of the voltage step up transformer 33 have adjustable tap points which can be set by an operator of the equipment in accordance with the desired energy level of the output to be produced. Thus, if only a low energy pulsed laser emission is desired, the variable tap points on the secondary windings would be adjusted to a low setting corresponding to the desired low energy level. However, if a high energy output were desired, the adjustable tap points may be moved to derive substantially the full output voltage appearing across the secondary in the position shown in FIG. 3. Movement of the variable tap point can be ganged and coordinated with a suitable control knob that also sets or preselects the energy level set by programmer 45. The three phase contactor 35 is comprised by the normally opened contacts 35A, 35B and 35C whose exciting winding 35 is under the control of a high voltage on-off switch shown in FIG. 7. The relay windings RY–4 (A, B and C) operate normally closed contact A, B and C only in the event of an overcurrent and are included for safety purposes. The over voltage relay 36 is comprised by a relay winding RY–3 which opens the normally closed contacts RY–3 shown in FIG. 7 in the event of an overvoltage. The transformer 101 supplies the necessary single phase excitation voltage to power switching circuit 99 shown in FIG. 1A. In operation, all three sets of short circuiting crowbar SCRs 37A, 37B and 37C are operated simultaneously to render these devices conductive when it is desired to discontinue charging of the pulse forming capacitive storage networks 22 and 23. The devices will remain conductive for so long as they are supplied with a gating-on potential to their gate electrodes. Upon the gating-on potential being removed from the gates the short circuiting crowbar SCR will again assume their non-conducting, current blocking condition upon the three phase supply voltage passing through its current zero. Upon this occurrence, the power supply will in effect be switched on thereby allowing charging of the pulse forming capacitor storage networks 22 and 23, and is switched-off upon the short circuiting crowbar SCRs being rendered conductive.

From the above brief description of FIG. 3, it will be appreciated that the constant current charging network allows rapid turn off of the charging current to the pulse forming capacitor storage network 22 and 23, thus allowing the capacitor networks to be rapidly charged to very precise levels. As will be explained hereinafter in connection with FIG. 5, the use of a squaring circuit in the voltage sensor permits the user of the system to select desired *energy storage levels* from the front panel control as opposed to corresponding voltage levels which have been used by previously known equipments of the same nature whereas energy level is the parameter that is most often used or specified with respect to a particular workpiece being machined or welded. The three phase line current passes through the contactor 35 and adjustable current relays monocyclic constant current charging network 34. The monocyclic constant current charging network consists of three identical inductors and three identical capacitors connected alternately in a ring, and which are slug tuned to resonate the network at slightly less than the line frequency. Connected in this manner, the monocyclic network transforms the three phase constant supply voltage to three phase constant current with a transformation impedance equal to the reactance to one of the network elements at the line frequency. These constant current lines are short circuited by the SCR crowbar devices which shorts each phase in both polarities when the crowbar SCRs are turned-on. Each phase is connected to one primary of a three phase voltage step up transformer 33 which raises the voltage to a desired level determined by the tap settings on the secondary windings. The desired output voltage is then rectified in the three phase fullwave rectifier and supplied through the charging diode 25 and 26 to the respective pulse forming capacitor storage networks 22 and 23. An important feature to note in the above-described arrangement is that the SCR crowbar devices control the energy to which the capacitor storage networks 22 and 23 are charged at the low voltage side of the voltage step-up transformer 33.

The average power delivered by the power supply to the energy storage network is:

$$P_{AV} = SCV^2/2$$

The general formula for calculating the maximum power required from the power supply is:

$$P_{MAX} = 2 P_{AV}[V_T/V_C] [1/(1-SD)] [V_{Nom}/V_{Low}]$$

Where:
$S$ = Laser discharge rate in pulses per second
$C$ = Total energy storage network capacitance in farads
$V_C$ = Required charge voltage in volts
$V_T$ = Power supply tap voltage on volts (for best supply utilization, use lowest tape which allows the supply to charge to $V_C$)
$D$ = Recharge delay in seconds
$V_{Nom}$ = Nominal power line voltage of supply to be used, in volts
$V_{Low}$ = The lowest power line voltage at which the power supply will be operated, in volts All of the above parameters should be determined and specified by the system designer.

FIG. 4 of the drawing is a detailed circuit diagram illustrating the construction of the pulse forming capacitor charging network 22 and its connection to the charging diode 25. Since the pulse forming capacitor network 23 and its associated circuitry is identical in construction and operation to that of 22, only circuit 22 has been shown. The circuit is entirely conventional in construction and comprises a series of interconnected LC filter sections having a clipper diode 29 and load resistor connected in series across one of its end terminals and a voltage level sensing resistor 41 connected across a remaining terminal which also may be connected to the charging diode 25 and to the electrodes of the gas filled flashlamps to be excited. It will be recalled that the flashlamps in effect constitute an electric switch that block current flow out of the capacitor until they are triggered into conduction. Since the charging diode 25 similarly will block reverse current flow, charge will be stored within the capacitor at a rate determined by the voltage level selected by suitable connection of the variable tap of the secondary winding of the voltage step up transformers. A relay is shown in series with the bleeder resistor 31 to indicate that it is rendered effective only when it is desired to discharge the energy stored up within the capacitor, and would be open under normal operating conditions. The end of line clipping diode 29 and its series connected load resistor are provided for clipping off negative going pulses produced in the pulse forming network upon the flashlamps being triggered and immediately following the output, positive going triggered pulse. These negative going pulses are produced due to resonant effects in the circuit, and would degrade the operation of the flashlamps if they were not clipped and eliminated.

Figure 5A:
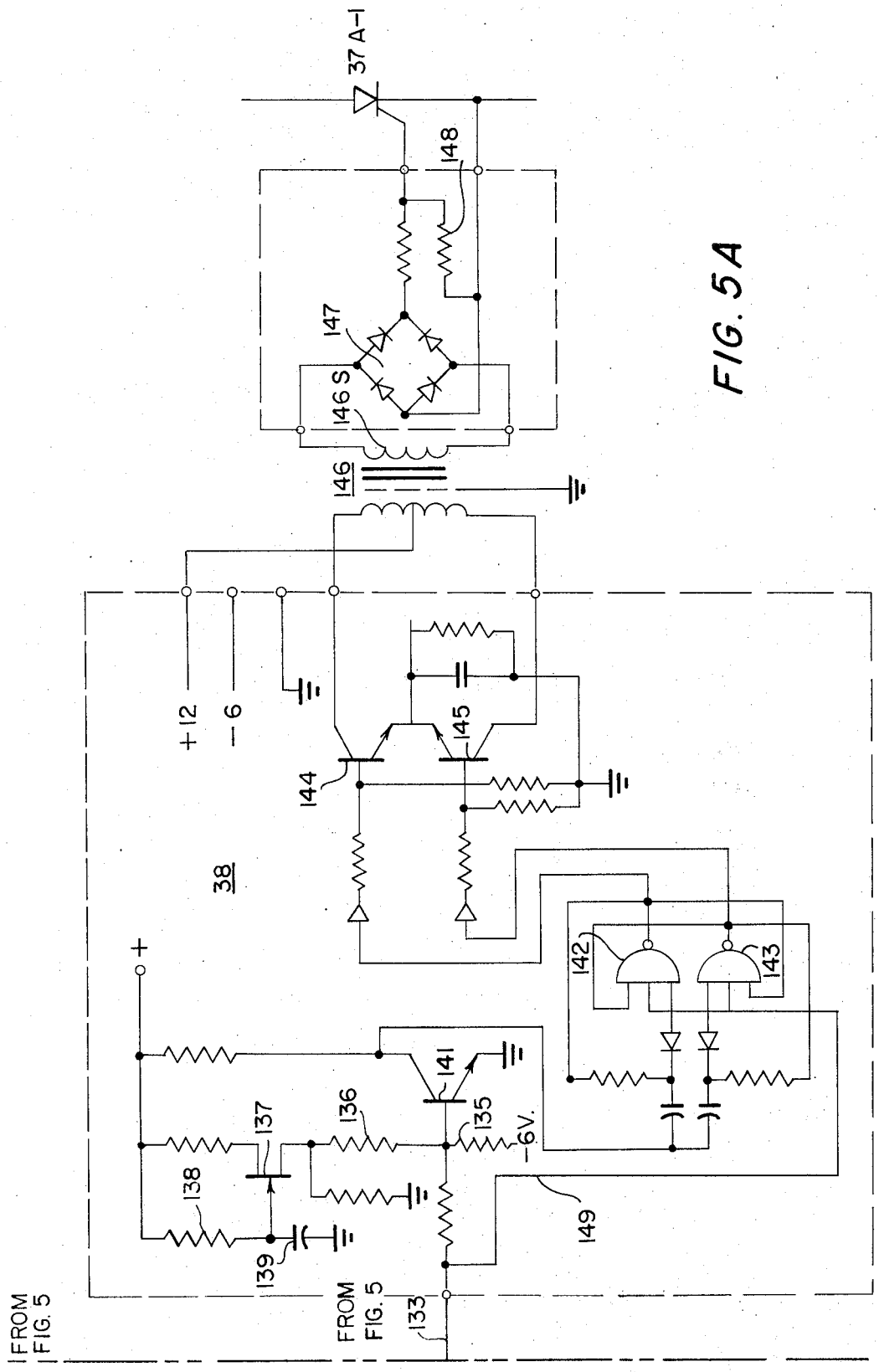

The storage capacitor voltage sensing resistor is shown again at 41 in FIG. 5 of the drawings and is coupled over the coaxial conductor 111 to the input of the energy level detector 39. The energy level detector 39 is comprised by an analogue computation circuit shown at 112 for performing a squaring and divide by 10 processing operation with respect to the sensed voltage signal appearing across dividing resistor 41. Since the average output power $P_{av}$ is defined by the expression $P_{av} = SCV^2/2$ it is necessary to perform this squaring and division processing in order to convert the sensed stored value of energy in the storage capacitors from a voltage reference to an energy reference. This energy referenced signal is then supplied to a compensating network comprised by an adjustable tap resistor 113. The adjustable tap of resistor 113 is coupled to the input of a buffer amplifier 114 of conventional construction, and the adjustable tap point on the resistor is set by a stepping motor 114. The stepping motor 114 comprises a part of the laser beam actual energy sensing arrangement comprised by the beam sampler 16, photodiode 52, pulse integrator and reset circuit 53, energy level comparitor 55 and energy level feedback circuit 57 described in FIG. 1. The stepping motor and compensating potentiometer 113 in fact comprises a semifixed actual energy feedback reference signal source in that once it is set from a prior laser emission it retains the fixed position until a different energy level is sensed by the photodiode and the setting of the variable tap point on compensating potentiometer 113 adjusted to correspond to the new sensed energy level. Thus, it will be seen that the form of compensation provided in fact possesses memory for carrying over the actual laser beam measured energy value from one laser beam pulsed emission to the next. Additionally, should the laser system be shut down for purposes of adjusting the workpiece, etc, the semi-fixed, actual energy feedback reference signal potentiometer is retained at its last setting and does not require complex alignment procedures each time that the laser system is started up.

From the foregoing description, it will be appreciated that the input signal supplied to a buffer amplifier 114A in fact constitutes a measure of the actual energy stored in the pulse forming capacitor storage networks 22 and 23 compensated for losses incurred in the system by appropriate setting of the semi-fixed actual energy compensating potentiometer 113. This signal is amplified in buffer amplifier 114A and supplied to a summing junction 115 at the input of a summing amplifier 116. In addition, the energy level programmer shown partially at 45 supplies a second input to the summing junction 115 from a second buffer amplifier 117 for supplying a command energy level signal to the input of summing amplifier 116 in conjunction with the actual measured energy and stored energy feedback signals supplied through 114. Buffer amplifier 117 has its input connected selectively either to the output of a manually controlled potentiometer 118 through relay actuated contacts $M_o$, or alternatively to one of a set of 10 different automatically controlled potentiometers such as the one shown at 119 through the relay actuated contact $M_1$. For simplicity, only one of the numerically controlled energy level setting potentiometers 119 has been illustrated although it is to be understood that there are 10 additional relay control potentiometers of this type which automatically can be connected in circuit relationship with the buffer amplifier 117 by appropriate programming of the equipment. It will be seen that upon selective closure of the contacts $M_o$ for manual control, or any one of the contacts $M_1$–$M_{10}$ (not shown) automatic setting of the command energy level can be achieved by appropriate setting of the potentiometers 118, 119, etc. The reference signal derived across the potentiometer is then supplied to the input of 117 for further supply to the summing junction 115 at the input of summing amplifier 116. The variable resistors 121 and 122 provide zeroing adjustments to the desired energy level signals.

The signals appearing at the output of the respective buffer amplifiers 114 and 117 are of opposite polarity so that in effect the summing amplifier 116 serves as a zero cross over point detector for detecting the instant in time that the polarity of the signal at the summing junction 115 switches from a positive polarity signal normally appearing when the command energy level signal at the output of 117 exceeds the compensated actual stored energy signal appearing at the output of 114A. Upon the 114 signal exceeding the value of the 117 signal, the polarity of summing junction 115 switches to a positive polarity signal, is inverted in summing amplifier 116 and appears as a negative polarity signal at its output. The appearance of this negative polarity signal reverse biases the diode 124 so as to cause the diode to go from a conducting (binary 1 condition) to a non-conducting (binary 0) condition.

Upon the output signal from diode 124 in energy level detecting circuit 39 going from a binary 1 to a binary 0 condition, this signal is coupled through an inverting gate 125 and an inverting NAND gate 126 and appears as a binary 0 enabling signal at the output of NAND gate 126. The inverter 125 and NAND gate 126, and well as other inverters, NAND gates, AND gates, emitter follower, power emitter follower and power drivers described hereinafter in the logic portions of the system, all comprise conventional, commercially available, transistor binary logic circuits which operate between two binary signal levels 0 represented by an essentially zero voltage level and a binary 1 represented by an essential 6–12 volt level. Both positive and negative logic NAND gates are employed, but as used hereinafter, when it is mentioned that a particular point that is being referenced switches from 0 to a 1 level, it is to be understood that the point goes from an essentially zero voltage level to either a plus or minus 6–12 volt level in a well known binary logic manner. The truth table for the various logic gates is depicted in the following diagram:

TRUTH TABLE

| Inputs ABC | Output D |
|---|---|
| 000 | 1 |
| 001 | 0 |
| 010 | 0 |
| 011 | 0 |
| 100 | 0 |
| 101 | 0 |
| 110 | 0 |
| 111 | 0 |

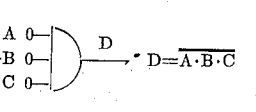

$\overline{D} = \overline{A \cdot B \cdot C}$

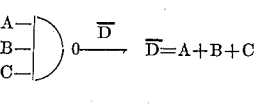

$\overline{D} = \overline{A + B + C}$

Upon the output from the energy level detector 39 switching from a binary 1 to a binary 0 at the desired energy level, the output from the NAND gate 126 likewise will switch from a binary 1 to a binary 0 due to the two inversions following the output from energy detector 39. The output from NAND gate 126 is supplied to a recharge delay monostable multivibrator comprised by four interconnected gates 127–130, a capacitor 131 and a diode 132. This recharge delay monostable multivibrator constitutes a timer which is polarity sensitive and is operated only when the output from the NAND gate 126 switches from a binary 1 to a binary 0 level, and produces and output binary 0 level enabling signal that is supplied over a conductor 133 for a minimum time interval of the order of 10 or 11 milliseconds. The switching of the potential over conductor 133 to a binary 0 level constitutes a turn-on signal with respect to the crowbar SCRs that control charging from the monocyclic constant current charging network supplying the energy storage capacitors. It is essential that this turn-on signal to the SCRs be maintained at least for the predetermined minimum interval of time noted above in order to allow an adequate deionization recovery time for the flashtubes to recover their current blocking capability after being flashed. It should be noted at this point that after successful flashing of the flash tubes (which consequently is accompanied with a discharge of the storage capacitors,) the output from the NAND gate 126 normally would revert back to its binary 1 level thus calling for turn-off of the crowbar SCR and a corresponding turn-on of monocyclic constant current charging network. However, because of the delay time introduced by the monostable multivibrator 127–132, immediate turn-off of the crowbar SCR is prevented at least for the minimum time duration recovery period noted.

The output switching signal appearing on conductor 133 is supplied to the junction of a pair of bias resistors 135 and 136 connected to one of the base electrodes of a unijunction transistor 137. Unijunction transistor 137 in conjunction with resistor 138 and 139 comprises a R-C unijunction transistor oscillator designed to operate at a relatively high frequency of the order of 5 kilohertz. Upon the potential from conductor 133 switching from a binary 1 to a binary 0, unijunction oscillator 137 is rendered operative and supplies output high frequency excitation signals through a power driver amplifier comprised by an NPN transistor 141 to a pair of flip flop cross connected gates 142 and 143. The flip-flop cross connected gates 142 and 143 are rendered alternately conductive at the high frequency of the oscillatory signal developed by UJT oscillator 137 and alternately excite a pair of power amplifiers comprised by NPN transistors 144 and 145 connected in a push pull fashion to drive the primary winding of a coupling transformer 146 in a push pull manner. The coupling transformer 146 in fact has a total of six secondary windings only one of which is shown at 146S connected across a fullwave rectifier 147 that supplies gate current to the control gate of one of the short circuiting SCR crowbar devices 37A-1 from a load resistor 148. From FIG. 3, it will be recalled that there are six such short circuiting SCR crowbar devices two for each phase which are connected in reverse polarity, parallel circuit relationship across the phase windings of the high voltage step up transformer connected in the output of the monocyclic constant current charging network. As was described in connection with FIG. 3, upon the SCR 37A-1 etc being rendered conductive simultaneously (due to the common coupling through transformer 146), charging of the pulse forming capacitor storage network through the monocyclic constant current charging network is quickly discontinued. It should be noted that in addition to the above briefly described connections, there is a direct connection between the input conductor 133 over a conductor 149 to input terminals to the respective flip-flop cross connected gates 142 and 143. The appearance of a binary 0 enabling potential across conductor 133 is transmitted over conductor 149 and serves to enable the cross connected flip-flop gates 142, 143 so that they can drive the power amplifier transistors 144 and 145. However, upon the potential of conductor 133 reverting to the binary 1 level (representative of the crowbar SCRs off condition and hence monocyclic constant current charging network on condition) the potential supplied across conductor 149 will operate as an inhibiting potential to prevent operation of the cross connected flip-flop gates 142 and 143 thereby preventing any output from being coupled across the coupling transformer 146 to fire the short circuiting crowbar SCRs. This additional inhibit or clamp assures against any possible transient switching of the crowbar SCRs due to noise generated in the circuit, etc.

Figure 5B:
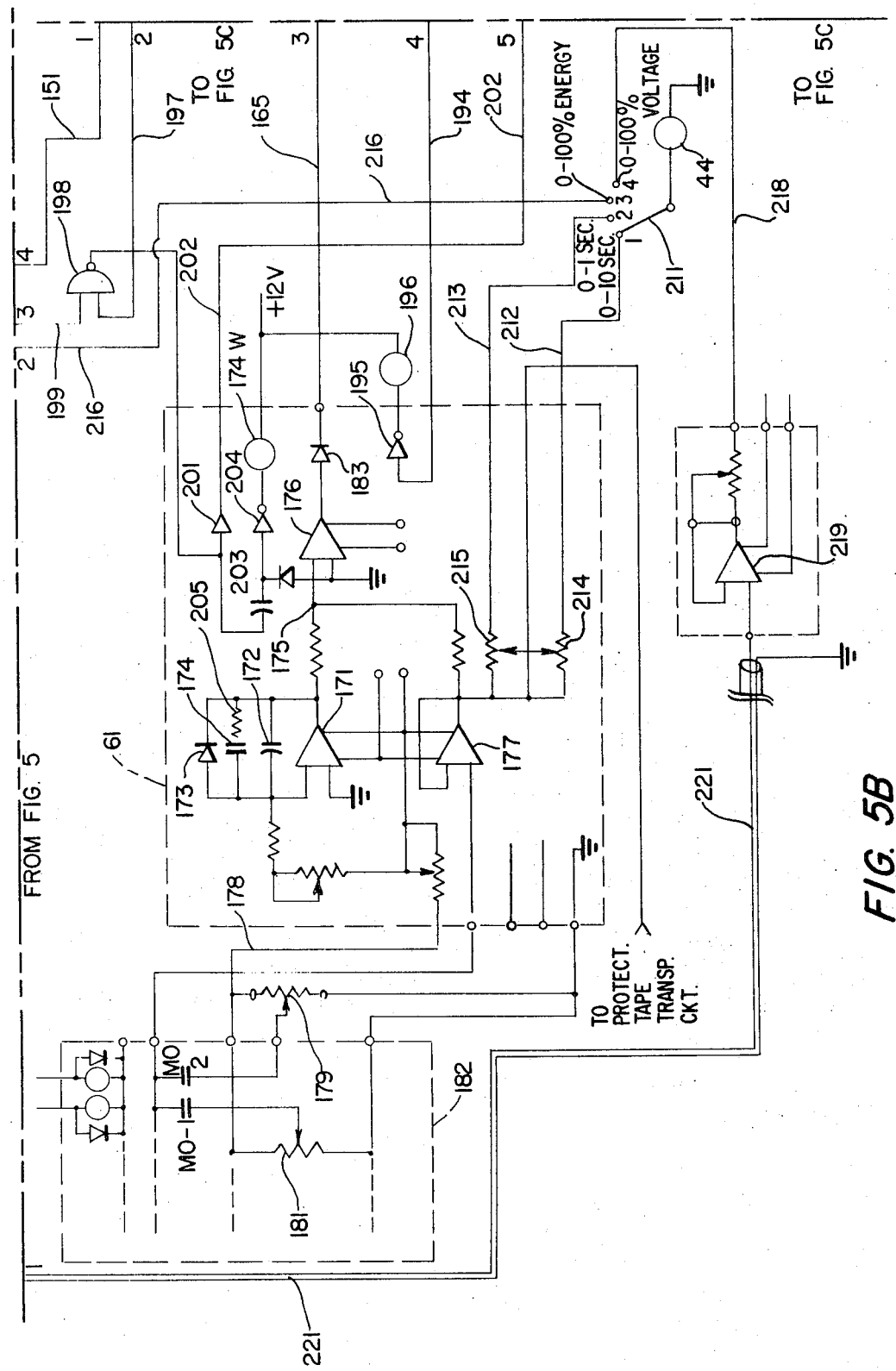
Figure 5C:
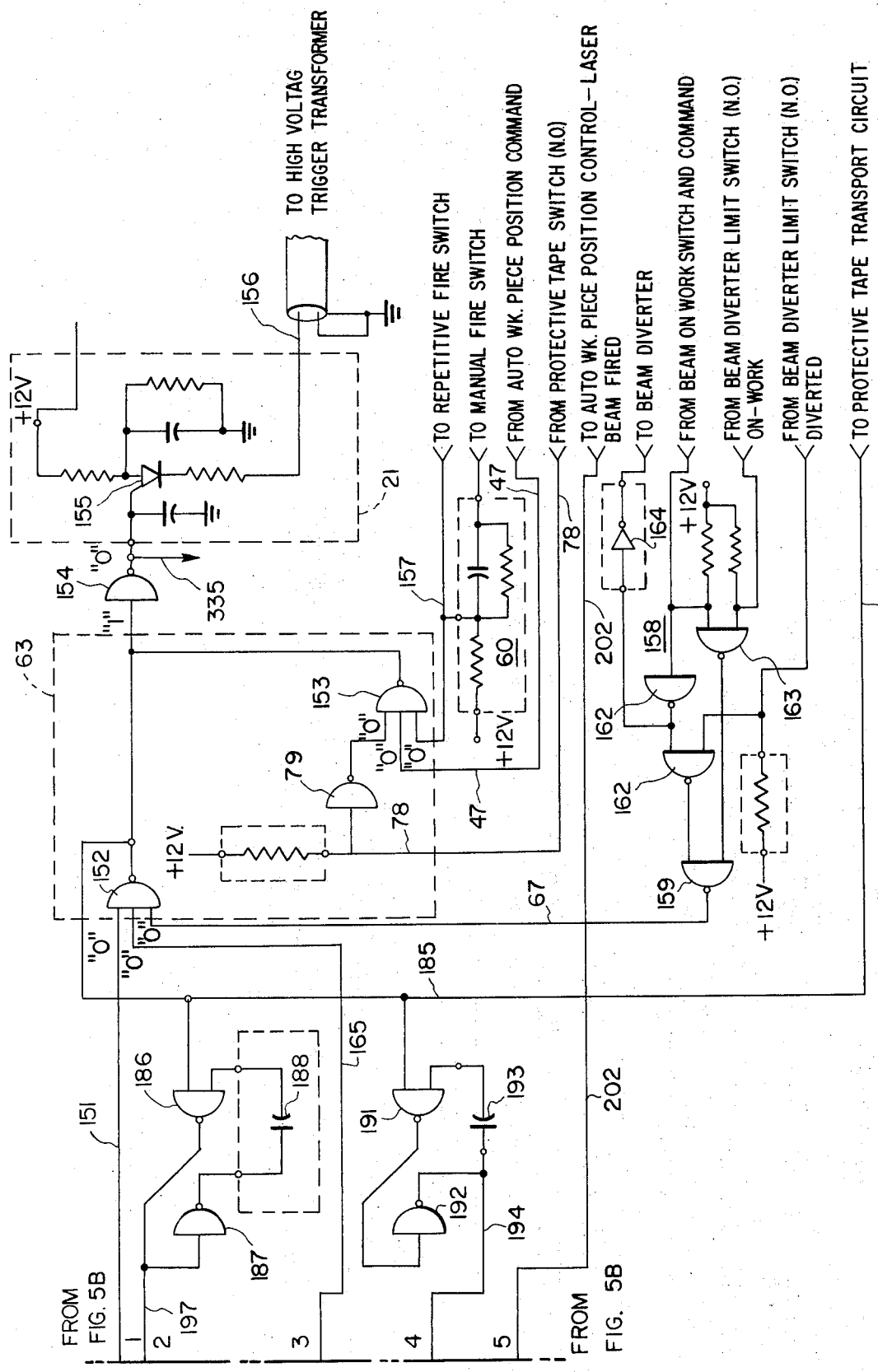

In addition to controlling the turn-on and turn-off of the short circuiting crowbar SCR's, the enabling/inhibit signal appearing at the output of the gate 126 is supplied over a conductor 151 shown extended through FIG. 5B to FIG. 5C where it is supplied as one of the controlling inputs to a three input NAND gate 152. The NAND gate together with a second three input NAND gate 153 and a one input summing NAND gate 154 comprise together a six input NAND gate that forms the inhibit and gating circuit 63 shown in FIG. 1A for controlling triggering of the high voltage trigger supply 21 that in turn triggers the flashlamps to excite one pulsed laser emission. The portion of the high voltage trigger supply shown at 21 is comprised by a low voltage programmable unijunction transistor device (PUT 155) that is rendered conductive upon the output potential from summing NAND gate 154 switching from the binary 1 to the binary 0 level. Upon PUT 155 being turned-on, an output trigger pulse of approximately 10 volts and 1 millisecond duration is supplied over the conductor 156 to the high voltage trigger pack including the high voltage trigger transformer 19, and results in triggering the pumping flashlamps to cause them to flash thereby exciting the laser. The output from the summing NAND gate 154 switches from its 1 to 0 level only when all of the inputs to the two NAND gates 152 and 153 are at the enabling 0 level. As traced through above, upon the pulse forming storage capacitor network being charged to the compensated command level, the potential appearing across the input conductor 151 will be switched to the required enabling 0 level.

The NAND gate 153 has supplied to one of its enabling inputs a command signal over conductor 47 from the automatic workpiece position control counters and registers 83 shown in FIG. 1B an enabling 0 signal upon the workpiece assuming a desired command position relative to the optical axis of the laser beam. A second enabling input is supplied over the conductor 78 through an inverting gate 79 to a second input to NAND gate 153. A third enabling input is supplied to NAND gate 153 from a repetitive-manual fire control circuit 60 over conductor 157 for either continuously enabling the gate under repetitive fire control conditions, or alternatively for supplying the manually generated enabling pulse from circuit 60 under conditions where the system is being fired manually. Thus, under repetitive fire conditions, the control switch mounted on the front panel is closed to provide a continuous 0 level enabling potential across conductor 157. Under manual fire conditions, the repetitive fire switch would be open and a manually closed push button switch on the front panel would be depressed by the operator of the equipment to supply the necessary manually generated 0 enabling potential to NAND gate 153.

The NAND gate 152 in addition to the capacitors stored to desired energy level enabling signal supplied over conductor 151, has supplied to a second of its input an enabling potential over conductor 67 from a beam diverter logic network shown at 158. The beam diverter logic network 158 is comprised by a plurality of interconnected NAND gates 159, 161, 162 and 163 having supplied thereto input enabling signals from the beam diverter limit switch which is a normally open switch when the beam diverter has the laser beam imaged on the work, a second beam diverter limit switch which is a normally open switch when the beam diverter has the laser beam imaged on the heat sink, and a third enabling NAND gate input indicative of the command position of the beam diverter. At the output from the inverter gate 162, an output command signal is derived through a power driver emitter follower 164 that is supplied back to control operation of the beam diverting prism motor which causes the beam diverter prism to be rotated into or out of the optical path of the laser beam. Under conditions where the right combination of beam-on work and the beam-on work limit switch are satisfied, or alternatively where the beam diverted position is commanded and the beam diverted limit switch is in the diverted position, binary 0 level enabling signals will be produced on conductor 67 for supply to the NAND gate 152.

The third and last of the total of six enabling potentials applied to the input of the NAND gate 152 is supplied over conductor 165 from the repetition rate generator circuit 61 shown in greater detail in FIG. 5B.

The heart of the repetition rate signal generator 61 shown in FIG. 5B is comprised by an integrating amplifier 171 having a capacitor 172 connected in its feedback path with the feedback voltage being clamped by a zener diode 173 and the charge in the feedback capacitor being reset to zero by means of a pair of relay actuated contacts 174. Due to the linear build up in voltage across the feedback capacitor 172 the integrating amplifier 171 operates to develop a sawtoothed wave-shape timing ramp starting from an initial zero voltage level and increasing to a maximum value in a ten second period. This time period limits the maximum interval of time between pulsed laser emissions, so if a given system required a pulse every twenty second or every thirty seconds, etc the time period would have to be extended to accomodate such long duration intervals between pulsed laser emissions. However, for example, it will be assumed that the repetition rate generator shown in 61 can be preprogrammed to provide output trigger pulses over intervals of one tenth of a second between zero and one pulse every ten seconds. Hence, the maximum repetition rate in the assumed example would be ten pulses per second. The sawtoothed timing ramp voltage appearing at the output of integrating amplifier 171 is supplied to a summing junction 175 at the input of a second summing amplifier 176 that also serves as a zero cross over point detector.

A second input, of opposite polarity to the timing ramp from integrating amplifier 171, is supplied to the summing junction 175 from the output of a buffer amplifier 177. Buffer amplifier 177 has a command reference signal supplied to its input over the conductor 178 which is representative of the selected command value of repetition rate at which the pulsed laser system will be operated. This command reference repetition signal is an analogue form and is derived from either a manually controlled potentiometer 179 mounted on the front panel control of the equipment or alternatively is derived from a plurality of nine different, automatically programmed, repetition rate reference generating potentiometers such as that indicated at 181. The dotted outline box 182 indicates only one of the automatically controlled, repetition rate reference signal generating potentiometers, and it is to be understood that there are a total of nine such units supplying the input of buffer amplifier 177 over conductor 178. Either the manual control potentiometer 179 or the automatic program control potentiometers such as 181 are selectively connected in effective circuit relationship with the input of buffer amplifier 177 through the relay actuated contacts MO-1 (and its counter parts) or alternatively the contacts MO-2 where manual scheduling of the repetition rate is desired. The output from the buffer amplifier 177 will be in the form of an essentially steady state reference signal having a magnitude (voltage value) representative of the desired repetition rate but of opposite polarity to the timing ramp voltage developed by the integrating amplifier 171.

The summing amplifier 176 sums together the two input signals derived from the integrating amplifier 171 and the buffer amplifier 177, and upon the timing ramp voltage from integrating amplifier 171 equaling the reference value established by buffer 177, the output of summing amplifier 176 switches from a positive 1 level to a 0 level thereby reverse biasing a coupling diode 183 in its output. This in turn results in providing the desired 0 enabling potential across the conductor 165 to the third and final input of NAND 152 in the inhibit and gating circuit 63 shown in FIG. 5C. The provision of this enabling potential at this point insures that the preselected minimum interval of time between the pulsed laser emissions has transpired and assuming that all other enabling inputs are present will result in the production of an output trigger pulse from the high voltage trigger supply circuit 21.

At the point in time when all six enabling inputs have been provided to the summing NAND gates 152-154, the potential at the output of NAND 152 will be switched from a 0 to 1 level thereby signalling that a trigger of the flashlamps has been initiated. This signal is supplied back over the conductor 185 shown in FIG. 5C to the protective tape transport circuit to tell it that a pulsed laser emission has been triggered, and that it should move a new piece of protective tape into position. This flashlamp-triggered reset signal is also supplied as an enabling input to a NAND gate 186 comprising a part of a monostable multivibrator further including the inverting gate 187, capacitor 188 and appropriate interconnections between their input and output terminals. The flashlamp-triggered reset signal appearing on conductor 185 is also applied to a second monostable multivibrator circuit comprised by NAND gates 191, 192 and capacitor 193 whose output is supplied over a conductor 194 to a power driver amplifier 195 and counter 196 shown in FIG. 5B. The monostable multivibrator comprised by NAND gates 191 and 192 merely serves to develop a counting pulse of the order of 100 milliseconds for supply to the counter 196 for maintaining an accurate count of the number of triggered laser pulse emissions.

The monostable multivibrator comprised by the interconnected NAND gates 186 and 187 generates a reset timing interval signal of the order of 5 milliseconds which is supplied back over the conductor 197 to one input terminal of a NAND gate 198 shown in FIG. 5B. NAND gate 198 comprises a reset NAND gate and has a second input terminal connected over a conductor 199 to the output of an inverter gate 125 shown in FIG. 5. It will be noted that upon the occurrence of the pulsed laser emission, the capacitor storage network will be suddenly discharged so that if the system operates properly, the input of inverter gate 125 will be switched from the 0 to the 1 level thereby causing inverter gate 125 output to be switched from the 1 to the 0 level indicating successful firing of the laser. This 0 level output at gate 125 is fedback over conductor 199 as an enabling input to the NAND gate 198, and so long as it occurs within the 5 millisecond reset timing period developed by monostable multivibrator 186-187, NAND gate 198 will be enabled and will provide a binary 1 level output voltage at its output terminal that serves as a reset signal for resetting the timing ramp generator 171 in FIG. 5B.

The reset signal appearing at the output of NAND gate 198 in FIG. 5B is then applied through an emitter follower amplifier 201 over conductor 202 shown in FIGS. 5B and 5C back to the automatic workpiece positioning control to tell that control that the laser beam has been successfully fired. Additionally, the reset timing signal appearing at the output NAND gate 198 is supplied back through a coupling capacitor 203 and power driver amplifier 204 to produce a pulsed excitation of the solenoid winding of relay 174W. Relay 174W has its contacts 174 connected in parallel with the integrating capacitor 172 of timing ramp generator amplifier 171. Thus, the appearance of the reset pulse causes the contacts 174 to be momentarily closed and opened to thereby instantaneously discharge timing capacitor 174 through a small limiting resistor 205. In this manner the timing ramp generator 171 is reset to zero and immediately starts building up a timing ramp voltage in a linear manner towards the reference value set by the output of the buffer amplifier 177 as described previously.

In addition to the above controls, the present system includes certain indicating instrument arrangements for measuring the performance of different parts of the system in accordance with the setting of a selector switch 211 shown in FIG. 5B. Selector 211 serves to selectively switch a milliameter 44 into circuit relationship with the different terminal points indicated in FIG. 5B. The first two terminal points number 1 and 2 are connected back through conductors 212 and 213 respectively through range changing adjustable resistors 214 and 215 to provide a measurement of the command value of repetition rate as determined by the level of the output signal appearing at the output of buffer amplifier 177. The third terminal number 3 is connected back through the conductor 216 shown in FIGS. 5B and 5 through a calibration adjusting resistor 217 to the output of the buffer amplifier 117 in the energy programming control subsystem. Upon being switched to terminal 3, the milliameter 44 will provide a reading of the selected or command energy value for each pulsed laser emission from zero to 100 percent energy. The fourth output terminal is connected back through the conductor 218 to the output of a converting amplifier 219. Converting amplifier 219 in turn has its input supplied from a conductor 221 shown in FIGS. 5B and FIG. 5 that is connected back to the voltage dividing sensing resistor 41 connected across the pulse forming capacitor storage network. The converting amplifier 219 serves to convert the sensed voltage appearing across resistor 41 to a current that is supplied to the milliameter 44 in order to read out the voltage of the capacitor storage network from zero to 100 percent of voltage. The milliameter 44 is of course mounted on the front panel control for the laser system.

There is an additional advantageous feature of the laser system control shown in FIGS. 5–5C which facilitates servicing of the control. During normal operation of the laser system, it will be necessary from time to time to service the control for maintenance purposes. During such maintenance it is often desirable to trouble shoot the circuit by tracing the signal levels occurring at different points in the control. For this purpose the NAND gate 126 shown in FIG. 5 includes an additional input terminal supplied from an inverting gate 120 that in turn has its input coupled through an RC network and isolating diode to a service terminal which is excited by the voltage applied to the coil of the high voltage contactor 35, enabling and inhibiting signals can be reproduced throughout the remainder of the laser system control without requiring that the pulse forming capacitor storage network be charged to the high voltages otherwise necessary to produce an enabling 0 level potential at the output of NAND gate 126. This not only avoids possible danger to the service man because of the presence of high voltages on the system but also results in a certain economy of power in not requiring large power expenditures to accommodate maintenance servicing.

Figure 6:
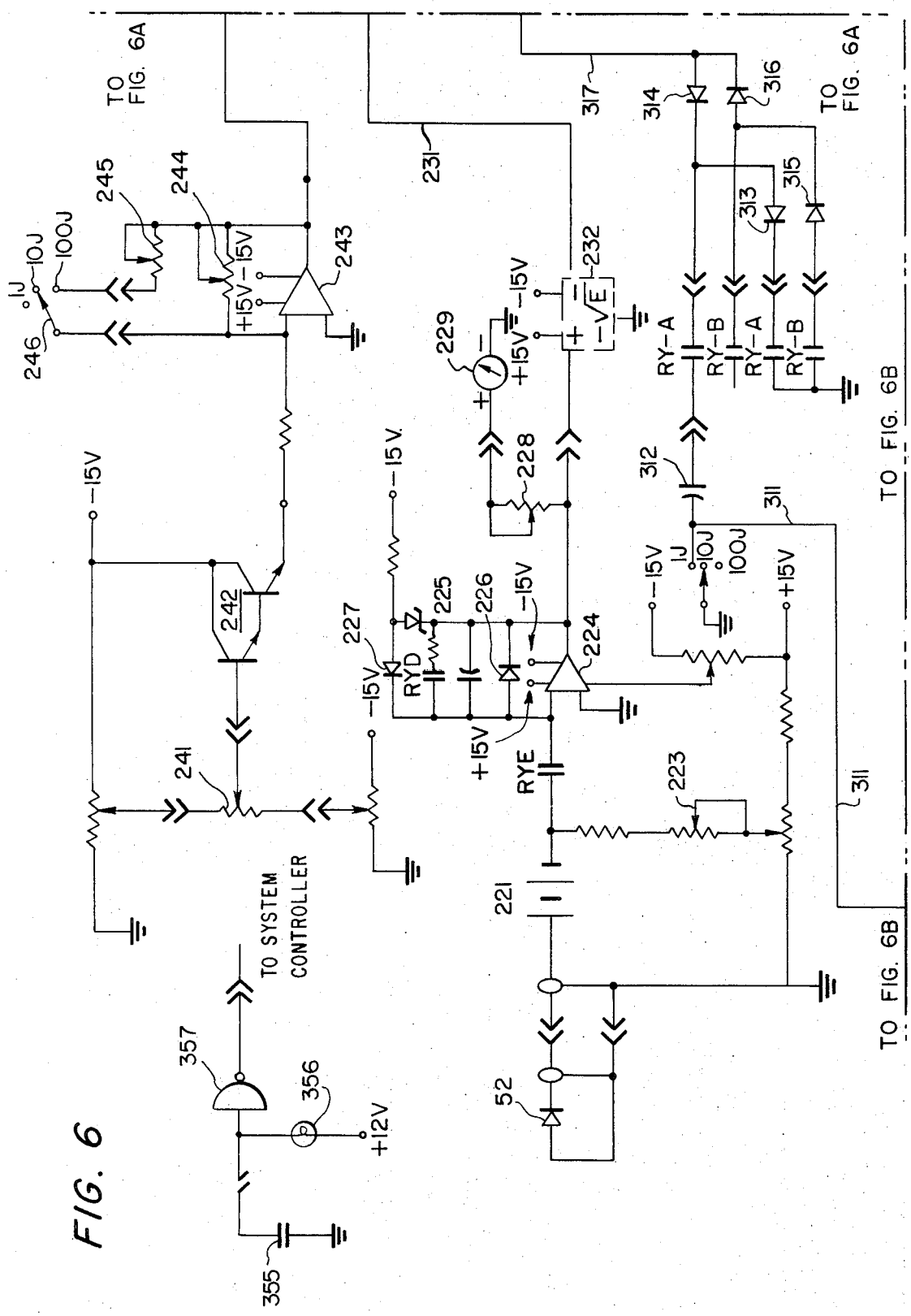
FIGS. 6, 6A and 6B comprise an overall, detailed, schematic circuit diagram of the photodiode laser beam sensor, pulse integrating and reset circuit, energy level comparison and semi-fixed energy level feedback circuit used in measuring the actual energy level of the pulsed laser beam emissions.
Figure 6A:
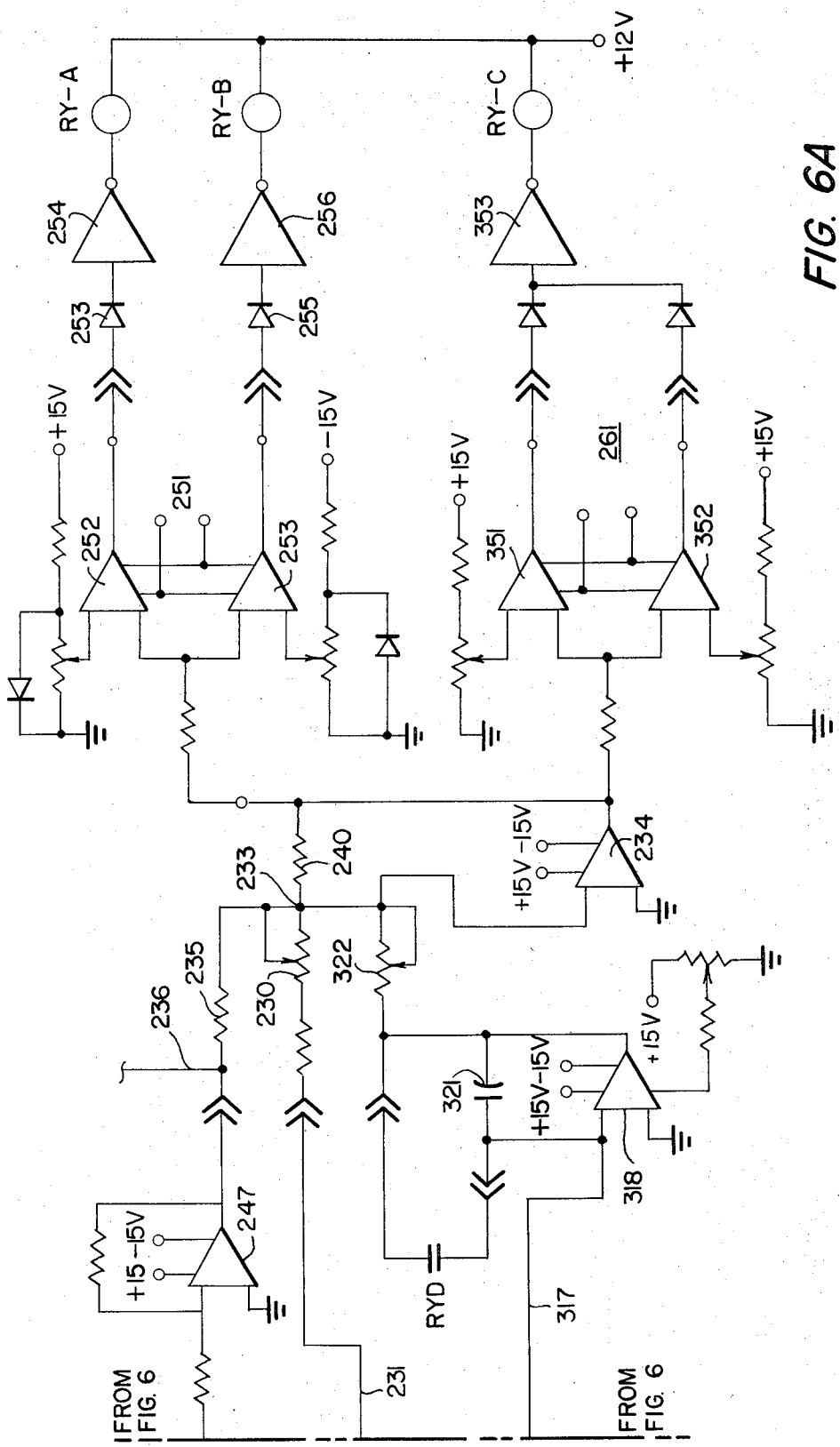
Figure 6B:
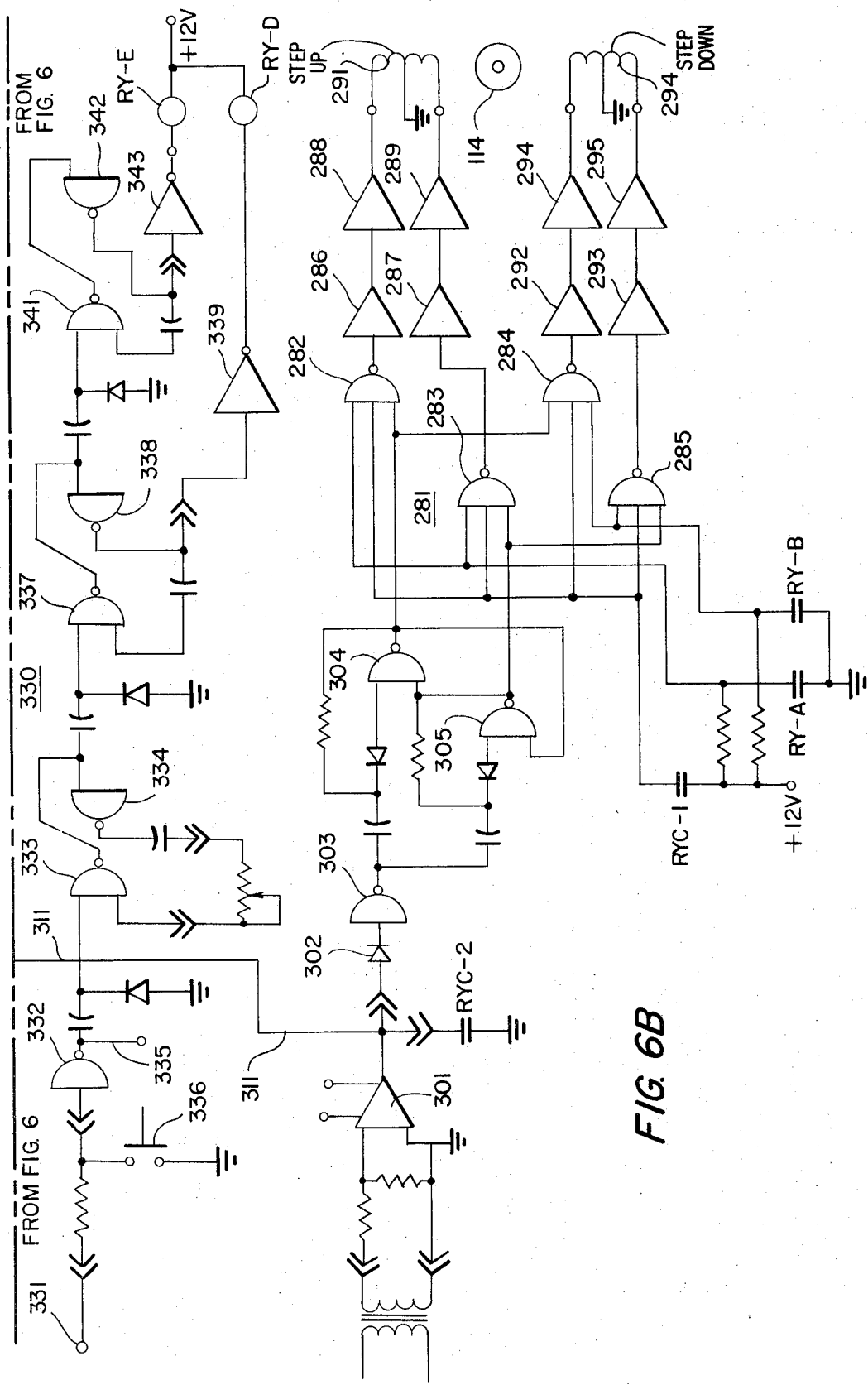

FIGS. 6, 6A and 6B illustrate in greater detail the features in construction of the actual laser beam energy sensing photodiode 52 and interconnected circuitry such as the pulse integrator and reset circuit 53, the energy level comparitor circuit 55 and the energy level feedback circuit 57. In FIG. 6, the photodiode is shown at 52 and is energized from a battery source of direct current voltage 221 connected in series circuit relationship with a variable resistor 222 for adjusting the dark current output of photodiode 52. Upon a fractional portion of a pulsed laser emission being imaged on the photodiode 52, a pulsed diode current current output will be supplied through contacts RYE to the input terminal of an integrating amplifier 224. Integrating amplifier has an integrating capacitor 225 connected in its feedback circuit for integrating the pulsed photodiode current and converting it to a voltage proportional to energy. Clamping diode 226 and 227 operate as low leakage clamps for limiting the feedback voltage to some predetermined value, for example 10 volts. In addition, a resetting, short circuiting pair of relay actuated contacts RYD is connected in series circuit relationship with a small current limiting resistor across the capacitor 225 for discharging the capacitor and thereby resetting the integrating circuit to zero immediately in advance of each sensed pulsed laser emission measured by photodiode 52. The output from the integrating amplifier 224 is supplied through a small zero adjusting resistor 228 to a milliameter 229 calibrated in terms of joules of energy in order to provide an output indication of the sensed laser beam.

When used with the system shown in FIG. 1–1C the output from the integrating amplifier 224 will be supplied directly over a conductor 231 to the summing junction of a summing amplifier shown in FIG. 6B. However, if the laser energy measuring equipment is to be used with some other laser system whose measurement and control is based on a voltage level reference as opposed to an energy level reference, it would be necessary to include in the output of integrating amplifier 224 an analogue computation circuit 232 for deriving the square root of the energy level referenced signal. A conventional commercially available feedback amplifier such as the Burr-Brown-4096/15 squaring amplifier appropriately modified to perform the square root function can be employed for this purpose.

The sensed actual measured beam energy signal supplied over conductor 231 from the output of integrating amplifier 224 or the output from the square root deriving circuit 232 is applied as one input to a summing junction 233 connected to the input of a summing feedback amplifier 234. In addition to the sensed actual energy measurement signal supplied over conductor 231, the summing junction 233 has applied to it a command reference level signal indicative of the selected or command value of energy. This signal is supplied over the summing resistor 235 and may be derived directly from the output of buffer amplifier 117 shown in FIG. 5 where the energy measuring controller is to be used in the overall system in FIG. 1, as depicted by the connection to conductor 236. Alternatively, an independent, operator controlled energy reference signal may be derived by an operator of the equipment from the reference energy level signal generating circuit under conditions where the energy measuring controller is to be employed with laser systems that do not include as an integral part of the system a separate energy level programming control. The reference energy level signal generating circuit is shown partially in FIG. 6 as being comprised by one half of a dual potentiometer 241 the other half of which is used to program the charge level and the pulse forming charge storage capacitor networks. The variable tap on the potentiometer 241 is connected through a one for one Darlington pair voltage amplifier 242 and supplied to the input of a range changing amplifier 243. The amplifier 243 includes an adjustable resistor 244 connected in its feedback path and a second adjustable resistor 245 connected in series with a range changing switch 246. It will be seen that with the switch 246 closed on either the 1 joule or 10 joule contacts, only the variable resistor 244 will be connected in the feedback path of range changing amplifier 243. However, upon the moveable contact of switch 246 being closed on the 100 joule fixed contact both resistors 244 and 245 are connected in the feedback path of amplifier 243 to thereby adjust its output to the desired increased energy value. The output from range changing amplifier 243 is then supplied through an inverting amplifier 247 shown in FIG. 6A whose output is connected across summing resistor 235 to the summing junction 233.

The summing junction 233 is connected in the feedback path comprised by feedback resistor 240 of summing amplifier 234 which again is adjusted to operation as a zero cross over detector since the actual measured energy value signal and the reference level command energy value signal are of opposite polarity. Accordingly, under conditions where the two signals are equal in value, or substantially equal so that the output from amplifier 234 is below some minimum limiting magnitude value (whether it is of negative or positive polarity), then no adjustments will be made to the semi-fixed energy feedback compensating resistor 113 shown in FIG. 5.

In the event that the actual sensed energy level departs from the programmed command value of the energy level, an output error signal will be produced in the output of summing amplifier 234, and this output signal is supplied to a polarity detecting circuit 251 and to a threshold detecting circuit 261.

The polarity detecting circuit 251 is comprised by a pair of operational amplifiers 252 and 253 adjusted so that they establish minimum threshold levels above and below zero value. The output from amplifier 252 which shall be assumed to establish the positive polarity minimum value threshold is coupled through a coupling diode 253 to the input of a power driver amplifier 254 that in turn actuates the solenoid winding of a relay RY-A. The amplifier 253 which is assumed to establish the negative polarity minimum threshold level likewise is coupled through a coupling diode 255 and power driver amplifier 256 for driving the solenoid winding of a second relay RY-B. Thus it will be appreciated that upon the output error signal appearing at the output of zero crossing summing amplifier 234 exceeding the positive polarity minimum threshold value the relay RY-A will be actuated, and in the event it exceeds the negative polarity minimum threshold value established by amplifier 253, the relay RY-B will be actuated.

As best seen in FIG. 6B the relays RY-A and RY-B function to close normally open contacts RY-A or RY-B in a switching gate circuit arrangement 281. The switching gating arrangement 281 is comprised by a first pair of coacting NAND gates 282 and 283 which are enabled by the closure of switch contacts RY-A and a second pair of coacting NAND gates 284 and 285 that are enabled by closure of relay actuated switch contacts RY-B. NAND gates 282 and 283 have their outputs connected through emitter followers 286 and 287 and power emitter followers 288 and 289, respectively, for alternately exciting a center tap stepup winding 291 that drives the stepper motor 114 in a first direction which shall be assumed to be in the up direction. Similarly, the NAND gates 284 and 285 operate through emitter followers 292 and 294 and power emitter followers 294 and 295, respectively, to actuate the center tap step down winding 296 that drives stepper motor 114 in the down direction.

In addition to the enabling input from the RY-A and RY-B contacts, the switching gates 281 are driven by synchronizing clock pulses generated in a clock pulse signal generator shown at 301. The clock pulse signal generator has its output supplied through a coupling diode 302 and buffer gate 303 to a flip-flop driver network comprised by a pair of interconnected NAND gates 304 and 305. The NAND gates 304 and 305 have their output connected to respective enabling inputs to NAND gates 282 and 284 in parallel and to NAND gates 283 and 285 in parallel. NAND gates 304 and 305 are interconnected in a normal flip-flop manner so that either one or the other, but not both, will be rendered conductive alternately in a flip-flop manner in synchronism with the synchronizing pulses supplied from the clock pulse generator 301. The clock pulse generator 301 operates to develop clock pulses having a repetition rate of the order of 60 pulses per second for appropriately exciting either the step up winding 291 or the step down winding 294 of stepper motor 114 upon either RY-A or RY-B contacts being selectively closed in the above described manner.

In addition to the above described enabling inputs, the switching NAND gates 282–284 all have a third enabling input supplied thereto through a normally open set of contacts RYC–1 which upon closure operates to clamp off the switching gates thereby preventing any stepping action by the stepping motor 114. A second set of RYC contacts shown at RYC–2 also is actuated simultaneously with the RYC–1 contact to clamp off the output from the clock pulse signal generator 301.

Clock frequency signal pulses are also supplied over a conductor 311 shown in FIGS. 6B and FIG. 6 to a capacitor 312. The capacitor 312 is selectively connected through the medium of logic switching contacts RY-A and RY-B and two sets of polarity sensitive coupling diodes for selectively supplying over the conductor 317 a series of voltage pulses which are either positive going or negative going in accordance with the logic setting of the relay actuated switch contacts RY-A and RY-B. These positive or negative going switching pulses will be in synchronism with the synchronizing clock signal pulses supplied from clock pulse signal generator 301, and hence are synchronized with any stepping action of the stepping motor 114. These synchronized negative or positive polarity pulses then are applied to the input of a feedback amplifier 318 that comprises a bipolar staircase signal generator.

Feedback amplifier 318 includes a feedback capacitor 321 in its feedback path and has a set of relay actuated contacts RYD connected in parallel with the capacitor 321. By this arrangement, the feedback path capacitor 321 functions to integrate the total number of either positive polarity or negative polarity clock signal synchronizing pulses supplied to the input of amplifier 318 over conductor 317, and to produce at the output of amplifier 318 either a positive polarity or a negative polarity staircase waveform output signal wherein each step in the staircase waveform is synchronized with the clock signal pulses derived from clock signal pulses generator 301, and hence each step is synchronized with one stepping action of the stepping motor 114. Thus, it will be appreciated that the amplifier 318 constitutes a bipolar staircase generator. The feedback capacitor 321 is proportioned to provide approximately one tenth of 1 percent correction to the setting of the potentiometer driven by stepping motor 114 for each input clock signal pulse supplied to amplifier 318. For this purpose capacitor 321 realizes approximately a 1/220th increase in voltage for each clock signal pulse applied to the input of amplifier 318.

The bipolar staircase waveform signal derived from the output of amplifier 318 is supplied through a summing resistor 322 to the summing junction 233 at the input of summing amplifier 234 for the purpose of progressively driving the output error signal at the output of amplifier 234 towards zero. The setting of the variable feedback resistor 322 provides a damping control on the effect of this feedback bipolar staircase waveform correction signal. By appropriate adjustment of resistor 322 the feedback bipolar staircase signal can be weighted to provide about one fifth of the effect of changes in either the reference energy level signal supplied through summing resistor 235 or the actual energy level resistor supplied through the summing resistor 230 to the summing junction 233. By thus weighting the effect of the bipolar staircase waveform correcting signal, the summing amplifier 234 will be overdamped so as to correct output error signals rather slowly in preference to fast acting correction which might cause oscillation about the zero error condition.

From the foregoing brief description, it will be appreciated that upon either a positive polarity or a negative polarity error signal being produced in the output of summing amplifier 234 which is in excess of the minimum threshold level established by the polarity detector 251, the polarity detector will actuate either the relay RYA or RYB to cause stepping motor 114 to step the potentiometer 113 in FIG. 5 up or down in a direction to drive the output error signal from 234 toward zero. Actuation of either of the relays RY-A or RY-B simultaneously selectively sets the bipolar staircase signal generator 318 to provide the proper polarity feedback staircase waveform correction signal to the input of summing amplifier 234 for the purpose of driving the amplifier output error towards zero synchronously with each stepping action of the stepping motor 114.

In order to reset the bipolar staircase signal generator 318, as well as the integrating amplifier 224, to zero prior to each pulsed laser emission measurement, a reset timing generator circuit means shown generally at 330 in FIG. 6B is provided. The reset timing generator 330 includes an input terminal shown generally at 331 for connection to a source of low voltage timing signals which are synchronized with the timing of the pulsed laser emission and are conditioned to lead (occur in advance of) the pulsed laser emissions by a few milliseconds. These imput timing pulses are applied through a buffer amplifier stage through a triggering capacitor and diode to the trigger input terminal of a one shot monostable pulse generator comprised by two interconnected gates 333 and 334. Where the laser energy measurements subsystem is to be employed with an overall energy controlled laser system such as shown in FIG. 1–1B, such a timing signal can ber derived from the output of the summing NAND gate 154 shown in FIG. 5C and applied directly through the conductor 335 to the capacitor and diode shaping circuit in the input of monostable multivibrator 333–334. As a further feature of control a manually operated reset puchbutton is shown at 336 for allowing manual reset of the energy measurement circuit as described hereinafter.

The monostable multivibrator 333–334 produces a momentary single output pulse that is shaped by a capacitor and diode input circuit to a second reset timing one shot multivibrator comprised by interconnected NAND gates 337 and 338 for producing an output energy sensor reset timing pulse of about 10 milliseconds duration. This first energy measurement reset timing pulse is supplied directly through a power driver amplifier 339 to actuate a relay winding RYD. Relay winding RYD then closes the corresponding contacts RYD connected across integrating capacitor 225 of integrating amplifier 224 and integrating capacitor 321 in the feedback path of bipolar staircase generator 318 to cause these capacitors to be discharged thereby resetting to zero both the integrating amplifier 224 and the bipolar staircase generator 318.

The trailing edge of the first energy measurement reset timing pulse from monostable multivibrator 337–338 is applied through a capacitor diode input shaping circuit to the trigger input terminal of a second energy measurement reset timing pulse generator comprised by interconnected NAND gates 341 and 342 for producing a second output energy measurement reset timing pulse of about 10 milliseconds duration. This second reset timing pulse is then supplied through a second power driver amplifier 343 to actuate the solenoid winding of a relay RY-E. Relay RY-E then closes its corresponding contacts in the input of the integrating amplifier 224 shown in FIG. 6 to thereby condition the lasser beam energy measurement circuit for measuring the next pulsed laser beam emission.

Another feature of the invention is the provision of a threshold detector circuit 261 connected to the output of the zero crossing detector summing amplifier 234 for sensing output errors in excess of a maximum limiting level and for disabling the correction circuitry portion including the stepping motor drive circuit and the bipolar staircase generator to prevent them from attempting to correct for such excessive errors. This characterisitic is desirable to have on an energy measurement system of the type envisioned during intervals while a laser system is intially placed in operation and being warmed up during the tuning stages to operate in its predesigned range of energy outputs. For this purpose, the threshold detector 261 is adjusted to detect errors in excess of 20 percent of the operating range of energy values of the system and thereafter to disable the correcting portions of the circuit as briefly mentioned above.

The threshold detector 261 is comprised by a pair of operational amplifiers 351 and 352 which are adjusted to respond to positive polarity and negative polarity error signals appearing at the output of the zero crossing detecting summing amplifier 234, respectively, which are in excess of a maximum limiting value. Upon the output error signal of amplifer 234 exceeding this maximum limiting value either amplifier 351 or 352 will supply an output actuating potential to a power driver amplifier stage 353 to actuate the solenoid winding of a relay RY-C As mentioned earlier, the relay RY-C serves to close the contacts RYC–1 for inhibiting operation of the switching gates 281 that control operation of stepping motor 114. Additionally, relay RYC closes contacts RYC–2 that clamps the output of the synchronizing clock pulse generator 301 to ground and prevents any stepping synchronizing pulses from being applied to the switching gates 281, or from being supplied over the conductor 311 to the bipolar staircase signal generating circuit 318 in FIG. 6A. Under these conditions, the only portions of the energy measurement circuit which will be operative will be the input portions including the photodiode, the integrating amplifier 224 and the meter 229 for use by an operator of the equipment during the tuning operation of the laser.

Still another control feature provided in the invention is illustrated in the upper lefthand corner of FIG. 6 and includes a limit switch shown at 355. The limit switch contacts 355 are connected through an inverting gate 357 back to a suitable indicating device such as a warning light on the system controller. The limit switch contacts 355 will be closed when the stepping motor 114 has been stepped completely to the end of its range of movement in providing correction through the compensating resistor 113 shown in FIG. 5. When this condition occurs, it is indicative of the fact that the flashlamps should be replaced due to aging, and this fact is signalled to the system controller fron panel light 356 to so advise the operator of the equipment.

Figure 7:
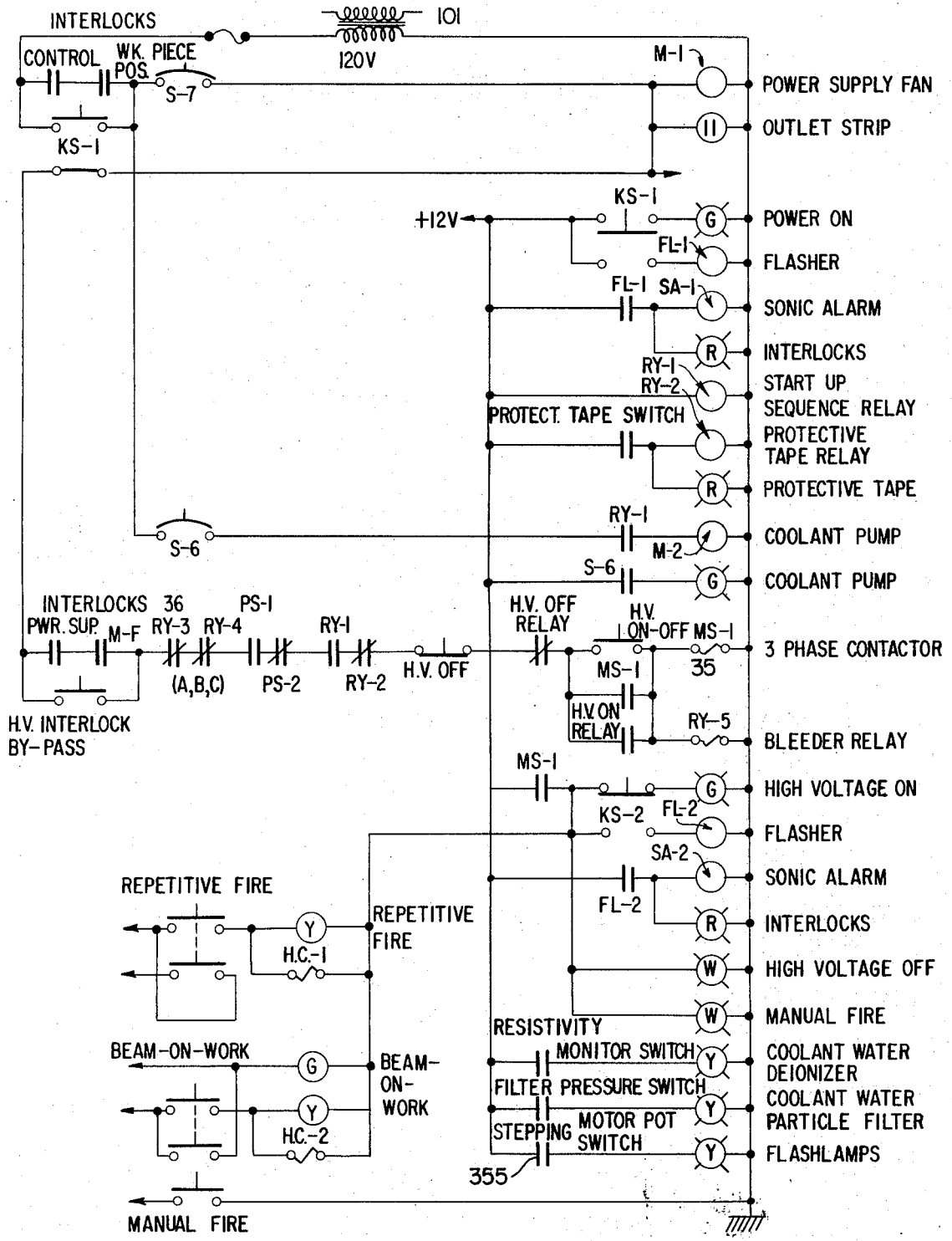
FIG. 7 is a schematic circuit diagram illustrating the several interlocking protective switching arrangements employed with the overall system of FIG. 1.

FIG. 7 of the drawings is a detailed schematic switching diagram illustrating the various protective switching system contact interconnections including those for the three phase contactor the protective tape, repetitive and manual fire control switches, startup sequence, and the like together with their associated indicator lights for signalling to an operator of the equipment which portions of the system are operative or are malfunctioning and the mode of operation. In view of the fact that the switching system shown in FIG. 7 is similar to those conventionally employed, a detailed description of the circuit is believed unnecessary.

From the foregoing description, it will be appreciated that the invention makes available a new and improved optically pumped pulsed laser system for use in machining, welding and similar operations, and which has an improved energy control whereby the pulsed laser system can be preprogrammed and variably controlled in terms of the actual energy level of each pulsed laser emission over a predetermined range of energy values, and simultaneously preprogrammed and variably controlled with respect to the repetition rate of the pulsed laser emissions to thereby provide a unitary and reliable pulsed laser system having high average output power. This system is made possible by the provision of an improved energy control power supply and novel actual laser beam energy sensing circuit for sensing and controlling the actual energy level of the laser beams, and for use in tuning and aligning the laser system. The system provides an improved means for maintaining thermal stability of the laser rod or other lasing elements, and assures that a preselected value of energy is stored in the system prior to triggering of a pulsed laser emission. Control over the repetition firing rate of the system is synchronized with automatic workpiece positioning to assure that triggering occurs only after the workpiece has been properly positioned in accordance with command instructions. Additional positive features such as assuring that a clear piece of protective tape has been properly positioned in the laser beam optical path also is included along with monitoring of the coolant system, etc.

Having described one embodiment of a pulsed laser system having improved energy control with improved power supply, laser emission energy sensor and adjustable repetition rate control feaures constructed in accordance with the invention, it is believed obvious that other modifications and variations of the invention are possible in the light of the above teachings. It is therefore to be understood that changes may be made in the particular embodiment of the invention described which are within the full intended scope of the invention as defined by the appended claims.

What is claimed is:

1. A pulsed laser system and control including in combination pumped laser means for producing a relatively high intensity laser beam of coherent light of high average energy which is variable over a predetermined range, pumping and resonator means coupled to the laser means for inducing emission of the laser beam at an energy level proportional to the energy level of the output emission from the pumping and resonator means, variable charge capacitor storage circuit means coupled to and supplying electric energy to said pumping and resonator means at a charge elvel that determines the energy level of the stimulated output laser beam, electric power supply means energized from a conventional source of an electric power and coupled to and supplying electric energy to said variable charge capacitor storage circuit means, charging level control circuit means coupled to said electric power supply means for controlling the energy level to which the variable charge capacitor storage circuit means is charged, said electric power supply means comprising a voltage step-up transformer and high voltage rectifier circuit means, a low voltage monocyclic constant current charging networks for supplying said variable charge capacitor storage circuit means through said voltage step-up transformer and high voltage rectifier circuit means, said charging level control circuit means comprising fast responding SCR crowbar short circuiting means coupled across the output from said low voltage monocyclic constant current charging network for short circuiting the output from the network to thereby discontinue in a fast responding manner the charging of the variable charge capacitor storage circuit means from the monocyclic constant current charging network, capacitor storage circuit energy level sensing means coupled to the variable charge capacitor storage circuit means for sensing the energy level to which the variable charge capacitor storage circuit means is charged, computation circuit means coupled to the energy level sensing means for converting the sensed measure of energy into an electric signal representative of the total actual energy stored in the variable charge capacitor storage circuit means measured in terms of joules of energy, feedback control circuit means for controlling the operation of said SCR crowbar short circuiting means and responsive to the output from said computation circuit means for automatically discontinuing charging of said variable charge capacitor storage circuit means at a desired storage energy level, means disposed in the optical path of the laser beam for partially diverting a fractional portion of the beam, photosensitive means responsive to the diverted fractional portion of the laser beam for deriving sensed actual laser beam energy feedback signal, and comparison circuit means responsive to the output from said photosensitive means and to a preprogrammed value of energy level for controlling the operation of the computation circuit means for appropriately compensating the stored energy level in the variable charge capacitor storage circuit means intermediate each pulse operation of the laser system in accordance with the value of the sensed actual laser beam energy feedback signal whereby losses incurred in the high power pulsed laser system are compensated by adjusting the stored energy level of the capacitor storage circuit means to a value sufficient to make up for such losses following each pulsed operation of the laser system.

2. A pulsed laser system and control according to claim 1 wherein said feedback control circuit means is comprised by comparison circuit means supplied from the output of said computation circuit means and energy level selector programming means for supplying to the comparison circuit means an input command desired energy level value to which the variable charge capacitor storage circuit means is to be charged, the command value of energy level being supplied to the comparison circuit means in conjunction with the output from said computation circuit means for comparison in said comparison circuit means and for deriving an output feedback control signal upon the sensed energy level of the variable charge capacitor storage circuit means equaling the command value of energy for use in controlling operation of said charging level control circuit means.

3. A pulsed laser system and control according to claim 2 further including trigger circuit means for controlling operation of said pumping means and for initiating operation of said pumping means, trigger inhibit circuit means for controlling operation of said trigger circuit means, and means coupling said trigger inhibit circuit means to the output from said comparison circuit means for inhibiting triggering of said pumping means until the energy level obtained by the charging circuit means achieves the programmed value set by the energy level selector programming means.

4. A pulsed laser system and control according to claim 1 further including trigger circuit means for controlling operation of said pumping and resonator means and for initiating operation of said pumping and resonator means, trigger inhibit circuit means for controlling operation of said trigger circuit means, and means coupling said trigger inhibit circuit means to the compensated output from said comparison circuit means for inhibiting triggering of said puming and resonator means until the energy level obtained by the capacitor storage circuit means achieves the compensated value of charge level, and programmable variable trigger repetition rate control means coupled to and controlling said trigger inhibit circuit means for controlling the repetition rate of the pulsed laser emissions produced by the system.

5. A pulsed laser system and control according to claim 4 further including a laser beam heat sink, laser beam diverting means rotatable into the path of the laser beam for diverting the laser beam from its normal optical path and projecting it into the laser beam heat sink, beam diverter control means for controlling movement of said laser beam diverter means, and beam diverter inhibit and enabling signal generating means coupled to and controlling at least in part said trigger inhibit circuit means for inhibiting operation of said trigger circuit means during intervals while said lasser diverter means is being moved into or out of the laser beam optical path and for enabling said trigger inhibit circuit means upon the beam diverter assuming a commanded desired position relative to the laser beam optical path.

6. A pulsed laser system and control according to claim 5 wherein said high power pumped laser device includes an optical lens arrangement for focusing the laser beam into a highly focused intense laser light beam and further includes protective tape means moveable to a position intermediate the optical lens arrangement and a work piece for protecting the lens arrangement from back scattered particles, spray and the like, means for automatically moving a clean piece of protective tape into effective position intermediate the optical lens and the workpiece following each pulsed output of the laser beam, protective tape position monitoring means, and protective tape inhibit and enabling signal generating means coupled to and controlling at least in part said trigger inhibit circuit means for inhibiting operation of said trigger circuit means during movement of the protective tape and following a laser beam discharge therethrough, and for enabling said trigger inhibit circuit means only after a new portion of the protective tape has been moved into protective position intermediate the optical lens and the workpiece and is conditioned for a new pulsed laser beam output.

7. A high pulsed laser system and control according to claim 6 further including automatic workpiece position control means for supporting a workpiece relative to the optical axis of the laser beam and for automatically positioning the work piece relative to the laser beam in response to preprogrammed position command signals, automatis position control inhibit and enabling circuit means coupled to and controlling at least in part said trigger inhibit circuit means for inhibiting operation of the trigger circuit means during intervals of movement of the automatic position control and for enabling the trigger inhibit circuit means upon the automatic position control and for enabling the trigger inhibit circuit means upon the automatic position control having automatically positioned the workpiece in the next commanded position for treatment with the laser beam.

8. A pulsed laser system and control according to claim 7 further including manual-repetitive fire control circuit means coupled to and controlling at least in part said trigger inhibit circuit means for enabling said trigger circuit means for automatic operation by said programmable variable trigger repetition rate control means under automatic repetitive fire operating conditions and for inhbiting said trigger inhibit circuit means for operation only by a manually generated trigger signal developed through said manual-repetitive fire control circuit means manually by an operator of the equipment, and time delay signal generating means coupled to and controlled by the output from said computation circuit means and coupled to controlling operation of SCR crowbar short circuiting means for maintaining said SCR crowbar short circuiting means conducting for a predetermined time interval following initiation of conduction thereof to allow adequate recovery time for components of the pumping means following each operation thereof.

9. A pulsed laser system and control according to claim 3 further including resettable variable repetition rate trigger pulse generating circuit means for generating repetitive trigger pulses for supply to said trigger circuit means through said trigger inhibit circuit means, repetition rate selector programming means coupled to and controlling operation of said variable repetition rate trigger pulse generating means for setting the repetition rate of the trigger signal pulses derived by said variable repetition rate pulse generating means, and means for coupling the output from said variable repetition rate trigger pulse generating means said trigger inhibit circuit means for assuring a minimum desired interval of time between each operation of the trigger circuit means.

10. A pulsed laser system and control according to claim 9 further including reset feedback circuit means responsive to the production of a trigger enabling signal from said trigger inhibit circuit and discharge of the capacitor storage circuit means for resetting the variable repetition rate trigger pulse signal generating circuit means to zero to initiate the production of the next sucessive repetitive trigger signal pulse, said reset feedback circuit means including a reset period timing pulse generator circuit means responsive to the output from said trigger inhibit circuit means for producing a reset period timing signal pulse of predetermined time duration, reset period inhibit circuit means responsive to the output from said reset timing pulse signal generator, the output from said capacitor storage energy level sensing circuit means and to the comparison circuit means for producting a reset period initiating output signal pulse and means for supplying said reset initiating output signal pulse to said trigger signal generating means in response to the production of an output enabling trigger signal and a drop in the energy level of the capacitor storage circuit means.

11. A pulsed laser system and control according to claim 10 further including a laser beam heat sink, laser beam diverting means rotatable into the path of the laser beam for diverting the laser beam from its normal optical path into the laser beam heat sink, beam diverter control means for controlling movement inhibit signal generating means coupled to and controlling at least in part said trigger inhibit circuit means for inhibiting operation of said trigger circuit means during intervals while said laser diverter means is being moved into or out of the laser beam optical path and for enabling said trigger inhibit circuit means upon the beam diverter assuming a commanded desired position relative to the laser beam optical path.

12. A high pulsed laser system and control according to claim 11 wherein said high power pumped laser device includes an optical lens arrangement for focusing the laser beam into a highly focused intense laser light beam and further includes protective tape means moveable to a position intermediate the optical lens arrangement and a work piece for protecting the lens arrangement from back scattered particles, spray and the like, means for automatically moving a clean piece of protective tape into effective positions intermediate the optical lens and the workpiece following each pulsed output of the laser beam protective tape position monitoring means, and protective tape inhibit and enabling signal generating means coupled to and controlling at least part of said trigger inhibit circuit means for inhibiting operation of said trigger circuit means during movement of the protective tape and enabling said trigger inhibit circuit means only on the protective tape being properly moved and positioned for a new pulsed laser beam output.

13. A high power pulsed laser system and control according to claim 12 further including automatic workpiece position control means for supporting a work piece relative to the optical axis of the laser beam and for automatically positioning the work piece relative to the laser beam in response to preprogrammmed command position signals, automatic position control inhibit and enabling circuit means coupled to and controlling at least in part said trigger inhibit circuit means for inhibiting operation of the trigger circuit means during intervals of movement of the automatic position control and for enabling the trigger inhibit circuit means upon the automatic position control having automatically positioned the work piece in the next commanded position for treatment with the laser beam.

14. A pulsed laser system and control according to claim 13 further including manual-repetitive fire control circuit means coupled to and controlling at least in part said trigger inhibit circuit means for enabling said trigger circuit means for automatic operation by said programmable variable trigger repetition rate control means under automatic to repetitive fire operating conditions and for inhibiting said trigger inhibit circuit means for operation only by a manually generated trigger signal developed through said manual-repetitive fire control circuit means manually by an operator of the equipment and time delay signal generating means coupled to and controlled by the output from said computation circuit means and coupled to and controlling operation of said SCR crowbar short circuiting means for maintaining said SCR crowbar short circuiting means conducting for a predetermined time interval following initiation of conduction thereof to allow adequate recover time for components of the pumping means following each operation thereof.

15. A pulsed laser system and control according to claim 14 wherein said laser beam heat sink is water cooled and the laser system further includes a coolant system for circulating cooling water through said laser beam heat sink and other ocmponents of the laser system including the laser cavity for temperature stabilizing purposes, coolant system monitoring means coupled to and minitoring operation of the coolant system for characteristics such as pressure of the coolant, temperature of the coolant, conductivity of the coolant, and the like, and coolant system protective means coupled to and controlled by said coolant system monitoring means for indicating the existence of a malfunction condition within the coolant system.

16. A pulsed laser system and control according to claim 1 wherein the photosensitive means responsive to a fractional portion of a laser beam for developing an output signal representative of the actual energy of the laser beam further includes summing circuit means responsive to the output signal from a photosensitive device and an input reference level signal representative of the desired energy level of the beam for deriving an output signal indicative of the magnitude and polarity of any difference, stepping motor means for driving a potentiometer that develops a semi-fixed feedback reference signal representative of the value of the laser beam energy and which is retained at a set value from one laser beam emission to the next, polarity sensitive circuit means responsive to the summing circuit means for enabling said stepping motor means to step the poteniometer up or down, and means for deriving a signal representative of the stepping action of the potentiometer for use in driving the magnitude of the error signal at the output of the summing amplifier means towards zero whereupon the stepping action of the stepping motor will be stopped, said means for deriving a signal representative of the stepping action of the potentiometer comprises bipolar staircase signal generator circuit means for generating either a positive polarity or negative polarity staircase waveform biasing signal with each step in the staircase waveform biasing signal corresponding to one stepping motion of the stepping motor means which in turn corresponds to an incremental adjustment to the potentiometer for deriving a semi-fixed feedback reference signal representative of the actual value of the laser beam energy, and means for applying the staircase biasing signal to a third summing input of said summing circuit means for driving the magnitude of the error output signal of the summing amplifier means towards zero.

17. A pulsed laser system and control according to claim 16 further including reset timing signal generating circuit means responsive to an input timing signal that anticipates the laser emission to be measured by a preset interval of time, said reset timing signal generating circuit means serving to amplify and develop a corresponding timing signal for application to the bipolar staircase biasing signal generator means to reset the bipolar staircase generating circuit means to zero in advance of a laser emission to be measured, photosensitive device switching circuit means connected intermediate the output of the photosensitive device and the summing input of the summing circuit means for connecting the output of the photosensitive device to the input of the summing circuit means only during intervals while a laser emission is anticipated, and delayed timing pulse signal generating circuit means comprising a part of said reset timing signal generating circuit means and triggered thereby for supplying an enabling switching signal of predetermined time duration to said photosensitive switching circuit means for closing the same during the predetermined time duration while a pulsed laser emission is anticipated and following reset of the staircase signal generating circuit means, and wherein said polarity sensitive circuit means is responsive only to error output signals from said summing circuit means in excess of predetermined limiting minimum voltage values above and below zero value, and the controller further includes threshold detector circuit means connected to the output from said summing circuit means and responsive only to output error voltages in excess of predetermined maximum limiting voltage values above and below zero for deriving a disabling switching signal, and disabling protective switching circuit means responsive to the output from said threshold detector circuit means for disabling said energy controller upon the sensed actual energy of the laser beam exceeding the threshold values established by said threshold detector circuit means.

18. A pulsed laser system and control according to claim 17 wherein the photosensitive device comprises a photodiode and further including integrating circuit means responsive to the output from said photodiode for converting the photodiode current to a voltage value proportional to energy, said integrating circuit means including reset switching means responsive to the output from said reset timing circuit generator circuit means and operative synchronously with the resetting operation of the bipolar staircase signal generating means to reset the integrating circuit to zero prior to each measurement of the actual energy level of a laser beam emission, and output meter indicating means calibrated in joules of energy responsive to the output from said integrating circuit means for providing an operator of the equipment with a visible output indication of the actual measured energy level of the laser beam emission, and clock pulse signal generating means for deriving a synchronizing clock pulse signal and means for supplying said synchronizing clock pulse signal to said staircase signal generating circuit means and to said stepping motor means for synchronizing the operation thereof.

19. A pulsed laser system and control according to claim 18 wherein said laser emission sensing photodiode is connected in series circuit relationship with a battery source of direct current bias potential and an adjustable resistor for adjusting the dark current output from the photodiode, the series circuit thus comprised being coupled to the input of said integrating circuit means, and said integrating circuit means comprising a feedback amplifier including an integrating capacitor coupled between its output and input terminals for integrating the input current supplied from the photodiode over the interval of a pulsed laser emission and converting the sensed photodiode current into an output voltage proportional to energy based on an energy level reference, clamping circuit means coupled across said feedback capacitor for clamping the feedback voltage between predetermined limits, said reset switching means for resetting the integrating circuit means to zero in advance of each laser emission measurement comprising relay actuated switch contacts connected in parallel circuit relationship with said feedback capacitor and serving to discharge the feedback capacitor in advance of a laser beam emission measurement and said output indicating meter means comprising a milliameter connected to the output of said feedback amplifier integrating circuit means through an adjustable resitor employed for calibration purposes.

20. A pulsed laser and control according to claim 19 wherein the monocyclic constant current charging networks comprises a three phase monocyclic constant current charging network and the power supply further comprises a three phase relay actuated contactor for supplying the monocyclic network from a conventional three phase source of electric current, a three phase voltage step-up transformer coupled to the output of the three phase monocyclic constant current charging network having primary and secondary windings for stepping-up the voltage to a desired level, said fast responding SCR crow bar short circuiting means comprising bidirectional conducting crow bar SCR's connected across each of the three phase primary windings for quickly short-circuiting the primaries, SCR driver circuit means coupled to and controlling conduction of all of said bidirectional conducting SCR's simultaneously and responsive to the output from said comparison circuit means for discontinuing charging from the power supply, and three phase, full-wave rectifier circuit means coupled to the secondary winding of the three phase voltage step-up transformer for supplying electric energy to an energy storage means being supplied.

21. A pulsed laser and control according to claim 3 wherein the monocyclic constant current charging network comprises a three phase monocyclic constant current charging network and the power supply further comprises a three phase relay actuated contactor for supplying the monocyclic network from a conventional three phase source of electric current, a three phase voltage step-up transformer coupled to the output of the three phase monocyclic constant current charging network having primary and secondary windings for stepping-up the voltage to a desired level, said fast responding SCR crow bar short circuiting means comprising bidirectional conducting crow bar SCR's connected across each of the three phase primary windings for quickly short-circuiting the primaries, SCR driver circuit means coupled to and controlling conduction of all of said bidirectional conducting SCR's simultaneously and responsive to the output from said comparison circuit means for discontinuing charging from the power supply, and three phase, full-wave rectifier circuit means coupled to the secondary winding of the three phase voltage step-up transformer for supplying electric energy to an energy storage means being supplied.

22. A pulsed laser system and control including in combination pumped laser means for producing a relatively high intensity laser beam of coherent light of high average energy which is variable over a predetermined range, pumping and resonator means coupled to the laser means for inducing emission of the laser beam at an energy level proportional to the energy level of the output emission from the pumping and resonator means, variable charge capacitor storage circuit means coupled to and supplying electric energy to said pumping and resonator means at a charge level that determines the energy level of the stimulated output laser beam, electric power supply means energized from a conventional source of an electric power and coupled to and supplying electric energy to said variable charge capacitor storage circuit means, charging level control circuit means coupled to said electric power supply mans for controlling the energy level to which the variable charge capacitor storage circuit means is charged, said electric power supply means comprising a voltage step-up transformer and high voltage rectifier circuit means, a low voltage monocyclic constant current charging network for supplying said variable charge capacitor storage circuit means through said voltage step-up transformer and high voltage rectifier circuit means, said charging level control circuit means comprising fast responding SCR crowbar short circuiting means coupled across the output from said low voltage monocyclic constant current charging network for short circuiting the output from the network to thereby discontinue in a fast responding manner the charging of the variable charge capacitor storage circuit means from the monocyclic constant current charging network, capacitor storage circuit energy level sensing means coupled to the variable charge capacitor storage circuit means for sensing the energy level to which the capacitor storage circuit means is charged, and feedback control circuit means coupled to and controlling the operation of said charging level control circuit means, said feedback control circuit means comprising comparison circuit means having the sensed energy level derived by said capacitor storage circuit energy level sensing means supplied thereto, laser beam sensing means for sensing the actual energy level of each laser beam emission and deriving a semi-fixed feedback reference signal proportional to the actual measured energy level of each laser beam emission, said semi-fixed feedback reference signal being retained at a set value from one laser beam emission to the next for use in controlling succeeding laser beam emissions, means for supplying the semi-fixed feedback reference signal from said laser bean sensing means to said comparison circuit means following each laser emission, and energy level selector programming means coupled to and supplying to said comparison circuit means a selected command value of laser beam energy for each emission of the laser beam, said comparison circuit means serving to compare the input commanded value for the laser beam emissions to the measured actual value of the laser beam energy level and to the sensed energy level to which the capacitor storage circuit means is charged, and deriving an output error signal for controlling the operation of the charging level control circuit means following each laser emission in a manner to maintain the actual measured energy level of the laser beam emissions at the command energy level value despite losses incurred in the system.

23. A pulsed laser system and control according to claim 22 wherein said laser beam sensing means comprises means disposed in the optical path of the laser beam for partially diverting a fractional portion of the laser beam, photosensitive means responsive to the diverted fractional portion of the laser beam for deriving a sensed actual laser beam energy feedback signal, and compensating circuit means responsive to the output from said photosensitive means and operative to modify the operation of the comparison circuit means in a direction and by a magnitude appropriate to modify the stored energy level in the variable charge capacitor storage circuit means so as to compensate for losses.

24. A pulsed laser system and control according to claim 23 wherein said compensating circuit means further includes a laser beam measured energy feedback reference signal deriving means for deriving a semi-fixed feedback reference signal representative of the value of the laser beam measured energy and which is retained at a set value from one laser beam emission to the next for use in compensating the output derived from said comparison circuit means, said laser beam measured energy feedback reference signal deriving means being coupled to and controlled by said photosensitive means.

25. A pulsed laser system and control according to claim 23 wherein said photosensitive means comprises a photodiode and said laser beam measured energy feedback reference signal deriving means comprises integrating circuit means coupled to said photodiode for converting the photodiode current to a voltage proportionate to the energy of the laser beam, summing amplifier means responsive to the output from the integrating circuit means and an input reference level signal representative of the desired energy level of the beam for deriving an output signal indicative of the magnitude and polarity of any difference, stepping motor means driving a potentiometer that develops the semi-fixed feedback reference signal representative of the value of the laser beam energy and which is retained at a set value from one laser beam emission to the next, polarity sensitive circuit means responsive to the summing circuit means for enabling said stepping motor means to step the potentiometer up or down, and means for deriving a signal representative of the stepping action of the potentiometer for use in driving the magnitude of the error signal at the output of the summing amplifier means towards zero whereupon the stepping action of the stepping motor will be stopped.

26. A pulsed laser system and control according to claim 25 wherein the means for deriving a signal representative of the stepping action of the potentiometer comprises bipolar staircase signal generator circuit means for generating either a positive polarity or negative polarity staircase waveform biasing signal with each step in the staircase waveform biasing signal corresponding to one stepping motion of the stepping motor means which in turn corresponds to an incremental adjustment to the potentiometer deriving a semi-fixed feedback reference signal representative of the actual value of the laser beam energy, means for applying the staircase biasing signal to a third summing input of said summing circuit means for driving the magnitude of the error output signal of the summing amplifier means towards zero, reset timing signal generating circuit means responsive to an input timing signal that anticipates the laser emission to be measured by a preset interval of time, said reset timing signal generating circuit means serving to amplify and develop a corresponding timing signal for application to the bipolar staircase biasing signal generator means to reset the bipolar staircase generating circuit means to zero in advance of a laser emission to be measured, photosensitive device switching circuit means connected intermediate the output of the photosensitive device and the summing input of the summing circuit means for connecting the output of the photosensitive device to the input of the summing circuit means only during intervals while a laser emission is anticipated, and delay timing pulse signal generating circuit means and triggered thereby for supplying an enabling switching signal of predetermined time duration to said photosensitive switching circuit means for closing the same during the predetermined time duration while a pulsed laser emission is anticipated and following reset of the staircase signal generating circuit means.

27. A pulsed laser system and control according to claim 26 wherein said polarity sensitive circuit means is responsive to the error output signal from said summing circuit means in excess of predetermined limiting minimum voltage values above and below zero value, and the controller further includes threshold detector circuit means connected to the output from said summing circuit means and responsive only to output error voltages in excess of predetermined maximum limiting voltage values above and below zero for deriving a disabling switching signal, and disabling protective switching circuit means responsive to the output from said threshold detector circuit means for disabling said energy controller upon the sensed actual energy of the laser beam exceeding the threshold values established by said threshold detector circuit means, and wherein the photosensitive device comprises a photodiode and further including integrating circuit means responsive to the output from said photodiode for converting the photodiode current to a voltage value proportional to energy, said integrating circuit means including reset switching means responsive to the output from said reset timing circuit generator circuit means and operative synchronously with the resetting operation of the bipolar staircase signal generating means to reset the integrating circuit to zero prior to each measurement of the actual energy level of a laser beam emission, and output meter indicating means calibrated in joules for providing an operator of the equipment with a visible output indication of the actual measured energy level of the laser beam emission.

28. A pulsed laser system and control according to claim 27 further including analog computation circuit means coupled intermediate the output from said integrating circuit means and the input to the summing circuit means for converting the output voltage proportional to actual measured energy derived from the output of said integrating circuit means and which is in essence an energy level reference signal to a voltage reference level signal by deriving the square root value of the energy level reference signal derived by said integrating circuit means, clock pulse signal generating means for deriving a synchronizing clock pulse signal and means for supplying said synchronizing clock pulse signal to said staircase signal generating circuit means and to said stepping motor means for synchronizing the operation thereof, said laser emission sensing photodiode is connected in series circuit relationship with a battery source of direct current bias potential and an adjustable resistor for adjusting the dark current output from the photodiode, the series circuit thus comprised being coupled to the input of said integrating circuit means, and said integrating circuit means comprising a feedback amplifier including an integrating capacitor coupled between its output and input terminals for integrating the input current supplied from the photodiode over the interval of a pulsed laser emission and converting the sensed photodiode current into an output voltage proportional to energy based on an energy level reference, clamping circuit means coupled across said feedback capacitor for clamping the feedback voltage between predetermined limits, said reset switching means for resetting the integrating circuit means to zero in advance of each laser emission measurement comprising relay actuated switch contacts connected in parallel circuit relationship with said feedback capacitor and serving to dishcarge the feedback capacitor in advance of a laser beam emission measurement and said output indicating means comprising a multiameter connected to the output of said feedback amplifier integrating circuit means through an adjustable resistor employed for calibration purposes, and separate reference level signal generating circuit means under the control of an operator of the equipment and/or susceptible to automatic program control for generating the desired input reference level signal representative of the desired energy level of the laser beam for supply to the summing circuit means.

* * * * *